(12) United States Patent
Kawasaki et al.

(10) Patent No.: US 11,300,506 B2
(45) Date of Patent: *Apr. 12, 2022

(54) DROPLET SENSOR

(71) Applicant: MITSUMI ELECTRIC CO., LTD., Tokyo (JP)

(72) Inventors: Yuya Kawasaki, Tokyo (JP); Hideo Kurosawa, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 64 days.

This patent is subject to a terminal disclaimer.

(21) Appl. No.: 16/772,250

(22) PCT Filed: Nov. 7, 2018

(86) PCT No.: PCT/JP2018/041377
§ 371 (c)(1),
(2) Date: Jun. 12, 2020

(87) PCT Pub. No.: WO2019/130844
PCT Pub. Date: Jul. 4, 2019

(65) Prior Publication Data
US 2021/0102894 A1 Apr. 8, 2021

(30) Foreign Application Priority Data
Dec. 28, 2017 (JP) .................. JP2017-254956

(51) Int. Cl.
*G01N 21/552* (2014.01)
*G01N 21/01* (2006.01)
*G01N 21/43* (2006.01)

(52) U.S. Cl.
CPC .......... *G01N 21/552* (2013.01); *G01N 21/01* (2013.01); *G01N 21/43* (2013.01); *G01N 2021/435* (2013.01)

(58) Field of Classification Search
CPC ...... G01N 21/01; G01N 21/43; G01N 21/552; G01N 21/17
See application file for complete search history.

(56) References Cited

U.S. PATENT DOCUMENTS 5,661,303 A    8/1997  Teder
6,147,753 A *  11/2000 Koyama ............... B60S 1/0888
                                                    356/237.3
(Continued)

FOREIGN PATENT DOCUMENTS

DE    4102146 C1 *  9/1991  ............ B60S 1/0833
JP    S54-25883 U    2/1979
(Continued)

OTHER PUBLICATIONS

International Search Report for PCT/JP2018/041377 dated Jan. 29, 2019.
(Continued)

*Primary Examiner* — Shawn Decenzo
*Assistant Examiner* — Amanda Merlino
(74) *Attorney, Agent, or Firm* — IPUSA, PLLC

(57) ABSTRACT

A droplet sensor has an optical cover with a curved surface that forms a part of a spheroid, a light source positioned at a first focal point of an ellipse, the first focal point facing the curved surface, and a photodetector positioned at a second focal point of the ellipse. The ellipse has an eccentricity determined such that the curved surface has an effective detection area that satisfies conditions for total internal reflection at an interface with a gas and that does not satisfy the conditions for total internal reflection at an interface with a liquid.

14 Claims, 30 Drawing Sheets

(56) References Cited

U.S. PATENT DOCUMENTS

| | | | |
|---|---|---|---|
| 6,361,136 B1 | 3/2002 | Watanabe et al. | |
| 7,573,576 B2 | 8/2009 | Mordau et al. | |
| 2002/0033459 A1* | 3/2002 | Graves | B60S 1/0822 |
| | | | 250/573 |
| 2002/0154289 A1 | 10/2002 | Wilks, Jr. | |
| 2003/0156291 A1 | 8/2003 | Tsunetomo et al. | |
| 2005/0082499 A1 | 4/2005 | Graves et al. | |
| 2006/0043270 A1 | 3/2006 | Zimmerman | |
| 2017/0001601 A1 | 1/2017 | Lee et al. | |
| 2017/0291581 A1 | 10/2017 | Park et al. | |
| 2017/0291582 A1 | 10/2017 | Park et al. | |
| 2021/0102894 A1 | 4/2021 | Kawasaki | |

FOREIGN PATENT DOCUMENTS

| | | |
|---|---|---|
| JP | H08-297090 | 11/1996 |
| JP | 2004-511757 | 4/2004 |
| JP | 2009-150808 | 7/2009 |
| JP | 2014-211358 | 11/2014 |
| JP | 2014-238383 | 12/2014 |
| JP | 2019-120567 | 7/2019 |
| WO | 01/086259 | 11/2001 |

OTHER PUBLICATIONS

Office Action dated Aug. 10, 2021 with respect to the Corresponding Japanese Patent Application No. 2017-254956.
Office Action dated Aug. 17, 2020 with respect to the U.S. Appl. No. 16/801,624.

\* cited by examiner

FIG.4

| MATERIAL | INDEX OF REFRACTION | CRITICAL ANGLE FOR LIGHT MOVING FROM RESIN INTO AIR OR WATER | CONDITIONS FOR USE |
|---|---|---|---|
| RESIN | 1.60 | – | At angle $\theta i$ of incidence on the surface of spheroid ranging from 38.7 to 56.4 ($38.7° < \theta i < 56.4°$), detection sensitivity is improved making use of the phenomenon of total internal reflection |
| AIR | 1.00 | > 38.7° | |
| WATER (RAINDROPS) | 1.333 | > 56.4° | |

OPTIMIZED ECCENTRICITY
(WITH MAXIMUM AREA)
n = 1.60

FIG.8C

| ITEMS | NORMALIZED VALUE | ACTUAL VALUE |
|---|---|---|
| MAJOR AXIS RADIUS | 1.00 | 30 mm |
| MINOR AXIS RADIUS | 0.634 | 19.0 mm |
| ECCENTRICITY | 0.773 ||
| EFFECTIVE SURFACE AREA | 2.82 | 2540 mm$^2$ |
| ORTHOGRAPHIC AREA (PROJECTED AREA) | 1.71 | 1540 mm$^2$ |

FIG.9C

| ITEMS | NORMALIZED VALUE | ACTUAL VALUE |
|---|---|---|
| MAJOR AXIS RADIUS | 1.00 | 30 mm |
| MINOR AXIS RADIUS | 0.527 | 15.8 mm |
| ECCENTRICITY | 0.850 ||
| EFFECTIVE SURFACE AREA | 1.42 | 1280 mm$^2$ |
| ORTHOGRAPHIC AREA (PROJECTED AREA) | 0.823 | 741 mm$^2$ |

FIG.10C

| ITEMS | NORMALIZED VALUE | ACTUAL VALUE |
|---|---|---|
| MAJOR AXIS RADIUS | 1.00 | 30 mm |
| MINOR AXIS RADIUS | 0.800 | 24 mm |
| ECCENTRICITY | 0.600 ||
| EFFECTIVE SURFACE AREA | – | – |
| ORTHOGRAPHIC AREA (PROJECTED AREA) | – | – |

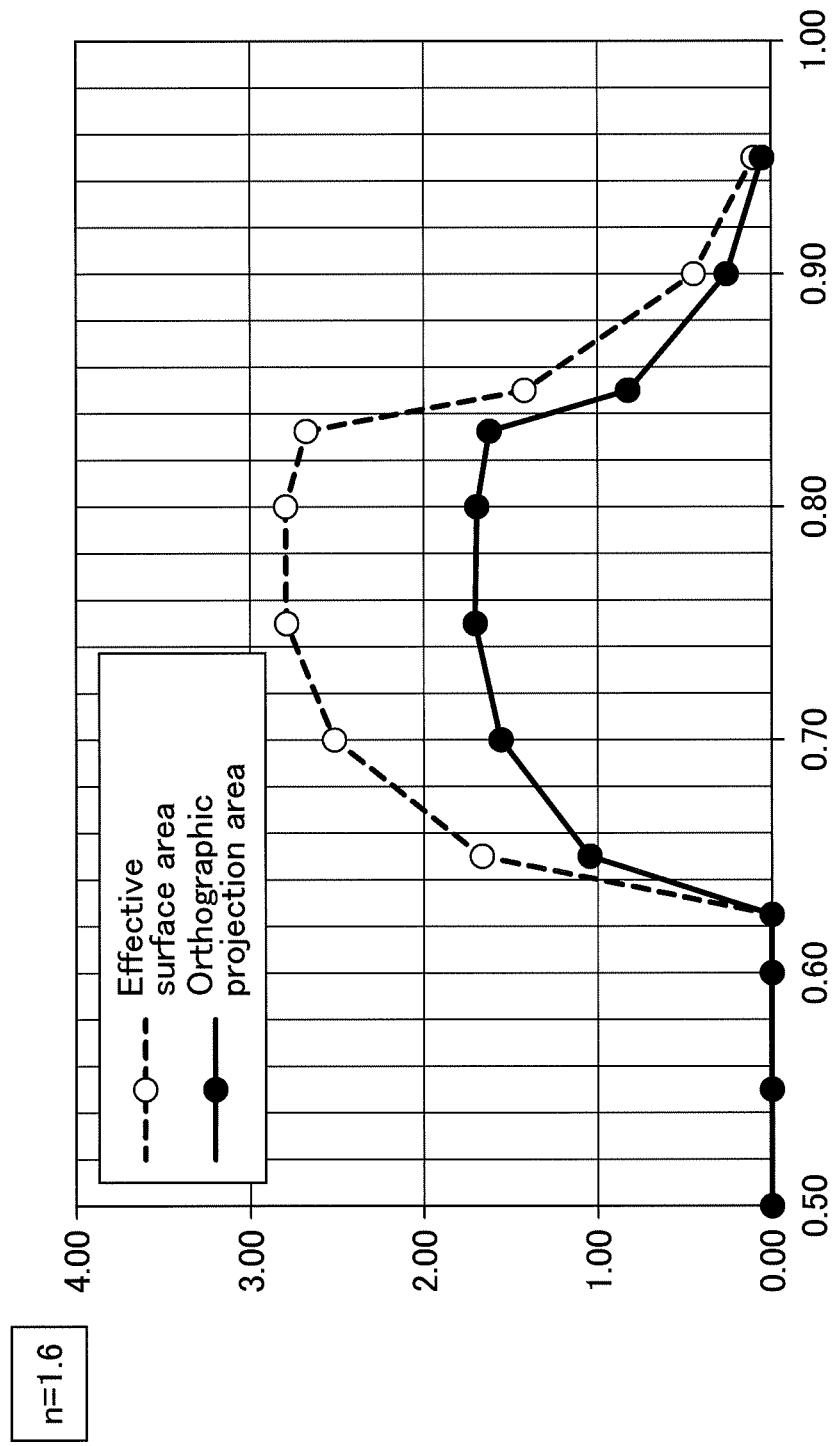

FIG.13C

| ITEMS | NORMALIZED VALUE | ACTUAL VALUE |
|---|---|---|
| MAJOR AXIS RADIUS | 1.00 | 30 mm |
| MINOR AXIS RADIUS | 0.625 | 18.7 mm |
| ECCENTRICITY | 0.781 ||
| EFFECTIVE SURFACE AREA | 2.77 | 2490 mm$^2$ |
| ORTHOGRAPHIC AREA (PROJECTED AREA) | 1.68 | 1510 mm$^2$ |

DROPLET SENSOR

TECHNICAL FIELD

The present invention relates to a droplet sensor that senses droplets, such as raindrops or water droplets.

BACKGROUND ART

Devices for detecting raindrops by making use of a change in reflectance are known (for example, see Patent Documents 1 and 2 presented below). The change in reflectance occurs, for example, when raindrops have fallen onto the detection area of a transparent plate. With these devices, the light emitted from a light source is reflected back from the surface of the transparent plate and detected by a photodetector. When raindrops are detected within the detection area, the reflectance at the interface between the transparent plate and the raindrop changes, and based on the variation in received light, the presence of raindrops is detected.

PRIOR ART DOCUMENTS

Patent Document 1: Japan Patent No. 6094354
Patent Document 2: Japan Patent No. 6167799

SUMMARY OF THE INVENTION

Technical Problem to be Solved

In Patent Document 1, the first reflecting means and the second reflecting means are provided, in addition to the transparent plate, and light having been reflected multiple times is detected at the photodetection area. The reflecting surface of the second reflecting means is formed as a surface with complicated curvature, which is difficult to manufacture. Totally reflected light and regularly reflected light (without total internal reflection) are mixed and incident together on the photodetection area. Furthermore, depending on the reflection pattern inside the device, the optical path length from the light emitting area to the photodetection area varies. In particular, the optical path of multiple-reflected light beam becomes longer. For this reason, the sensitivity varies depending on where the raindrops sit, and the detection accuracy is degraded.

In Patent Document 2, a refractive optical element and an additional optical element are used. The former one is used to collimate the light emitted from a light emitting device and to guide the collimated light onto a transparent plate. The latter one is used to collect the light totally reflected from the transparent plate and to guide the collected light to the photodetection area. In order to expand the detection area, the refractive optical element needs to have an appropriate size so as to fit the detection area. Because the refractive optical element has a complicated shape divided into multiple parts, it is difficult to fabricate and assemble such complicated optics into a device.

One of the objectives of the present invention is to provide a high-sensitivity droplet sensor with a simple structure and a large detection area.

Technical Solutions

In order to solve the technical problems stated above, a droplet sensor has
an optical cover having a curved surface that forms a part of a spheroid,
a light source positioned at a first focal point of an ellipse, the first focal point facing the curved surface, and
a photodetector positioned at a second focal point of the ellipse,
wherein the ellipse has an eccentricity determined such that the curved surface has an effective detection area that satisfies conditions for total internal reflection at an interface with a gas and that does not satisfy the conditions for total internal reflection at an interface with a liquid.

Advantageous Effect of the Invention

According to the invention, a high-sensitivity droplet sensor with a simple structure and a large detection area can be achieved.

BRIEF DESCRIPTION OF THE DRAWINGS

FIG. 4 illustrates conditions for use when a resin with a refractive index of 1.60 is used for the optical cover;
FIG. 8C illustrates parameters of the spheroid of FIG. 8A;
FIG. 9C illustrates specifications of the spheroid of FIG. 9A;
FIG. 10C illustrates specifications of the spheroid of FIG. 10A;
FIG. 11B illustrates eccentricity dependency of effective area when the index of refraction is 1.6.

FIG. 13C illustrates specifications of the spheroid of FIG. 13A;

BEST MODE FOR IMPLEMENTING THE INVENTIONS

In the embodiments, the presence of a droplet is detected optically by making use of the change in reflection due to the difference in index of refraction between gas and liquid. In order to detect deposition of droplets onto the sensor precisely and efficiently, the sensor surface is designed into the optimal shape to maximize the effective detection area for water droplets.

Figure 1A:
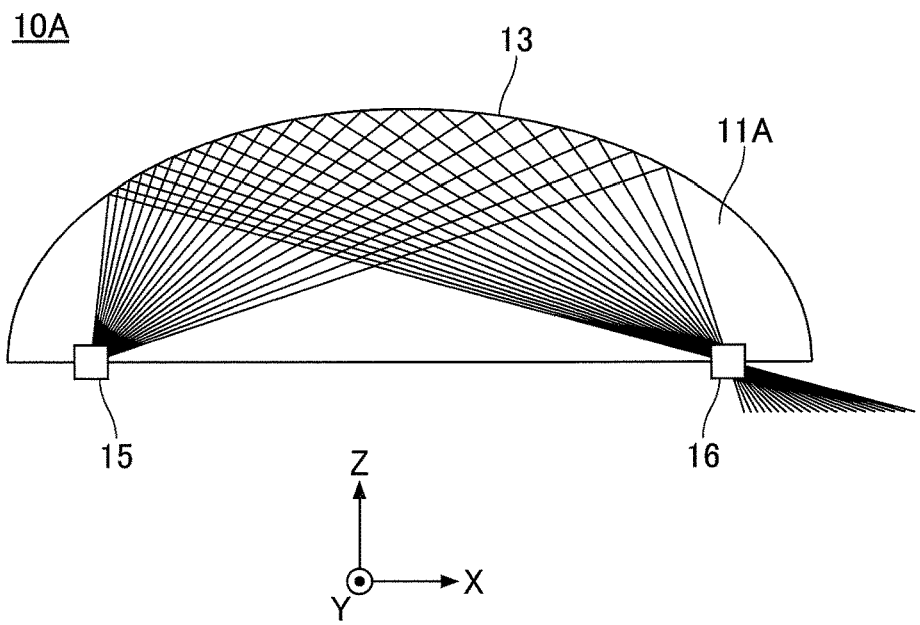
FIG. 1A is a diagram illustrating the basic structure of a rain sensor according to an embodiment, without a raindrop sitting on it.
Figure 1B:
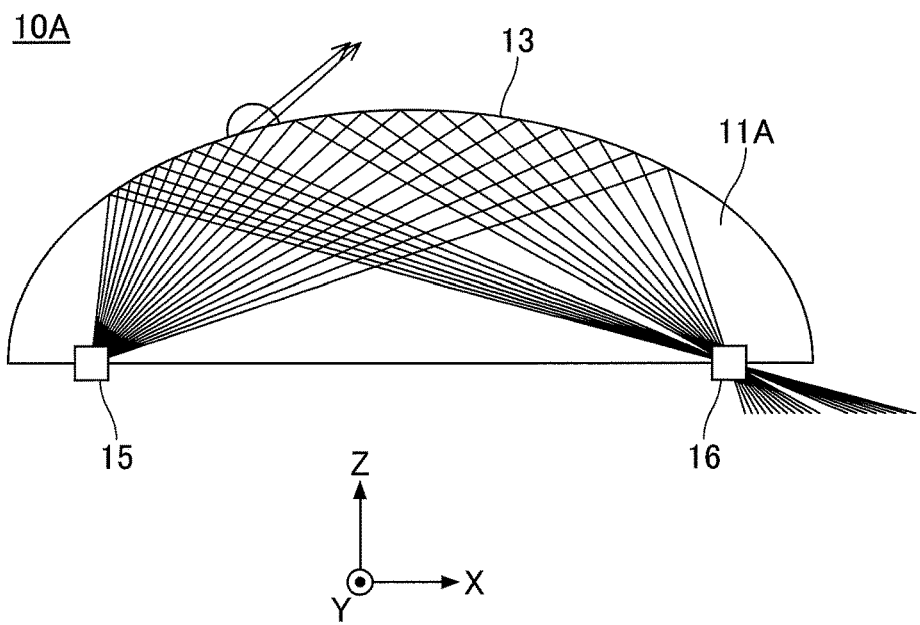
FIG. 1B is a diagram illustrating the basic structure of the rain sensor with a raindrop sitting on it.

FIG. 1A and FIG. 1B illustrates the basic structure of the droplet sensor according to an embodiment. The droplet sensor can be used as a rain sensor 10A, for example, to detect deposition of raindrops. From the detection result of the raindrops, rainfall per unit time and/or unit area can be estimated. The droplet sensor can also be applied to detection of droplets including dew condensation, water droplets, ink, etc. In the following embodiments, the rain sensor 10A will be described as an example.

The rain sensor 10A has an optical cover 11A with a curved surface 13, a light emitting device 15 provided at a first position facing the curved surface 13, and a photo-receiving device 16 provided at a second position facing the curved surface 13. The light emitting device 15 is an example of a light source, and the photo-receiving device 16 is an example of a photodetector, such as a photodiode.

The optical cover 11A is a solid cover that forms a part of a spheroid, and is made of a material transparent with respect to the wavelength of the light from the light emitting device 15. In the example of FIG. 1, the spheroid is a solid obtained by rotating an ellipse that has a major axis in the X direction and a minor axis in the Y direction around the major axis (X-axis). The optical cover 11A has a shape formed by cutting the spheroid along a plane parallel to the XY plane. In FIG. 1A and FIG. 1B, the height direction of the optical cover 11A is the Z direction.

The light emitting device 15 may be a light emitting diode (LED) configured to emit near-infrared light. The photo-receiving device 16 may be, for example, a quantum well (QW) photodiode that is sensitive to light in near-infrared region. The light emitting device 15 and the photo-receiving device 16 are provided in the plane facing the curved surface 13 of the optical cover 11A so as to be located on opposite sides with respect to the apex of the curved surface 13.

The photo-receiving device 16 receives the light output from the light emitting device 15 and reflected from the curved surface 13 of the optical cover 11A. The curved surface 13 is shaped to totally reflects the light from the light emitting device 15 at an interface with air and to transmit the light from the light emitting device at an interface with the water. As will be described later, the shape of the curved surface 13 is designed such that the effective detection area that satisfies the conditions for total internal reflection of light is increased.

As illustrated in FIG. 1A, when no raindrops are on the rain sensor 10A, the light output from the light emitting device 15 is totally reflected from the effective detection area of the curved surface 13 and is detected by the photo-receiving device 16.

As illustrated in FIG. 1B, when a raindrop sits on the outer surface of the rain sensor 10A, the conditions for total internal reflection are broken at the interface between the optical cover 11A and the water, and most of the light from the light emitting device 15 is transmitted through at the position of the raindrop. As a result, the amount of light incident on the photo-receiving device 16 is reduced. By monitoring the change in the amount of light received at the photo-receiving device 16, the presence and the volume of the raindrops can be detected. The curved surface 13 of the optical cover 11A has an isotropic shape with respect to the apex, and the raindrop can be detected regardless of the position where the raindrop sits.

Figure 2A:
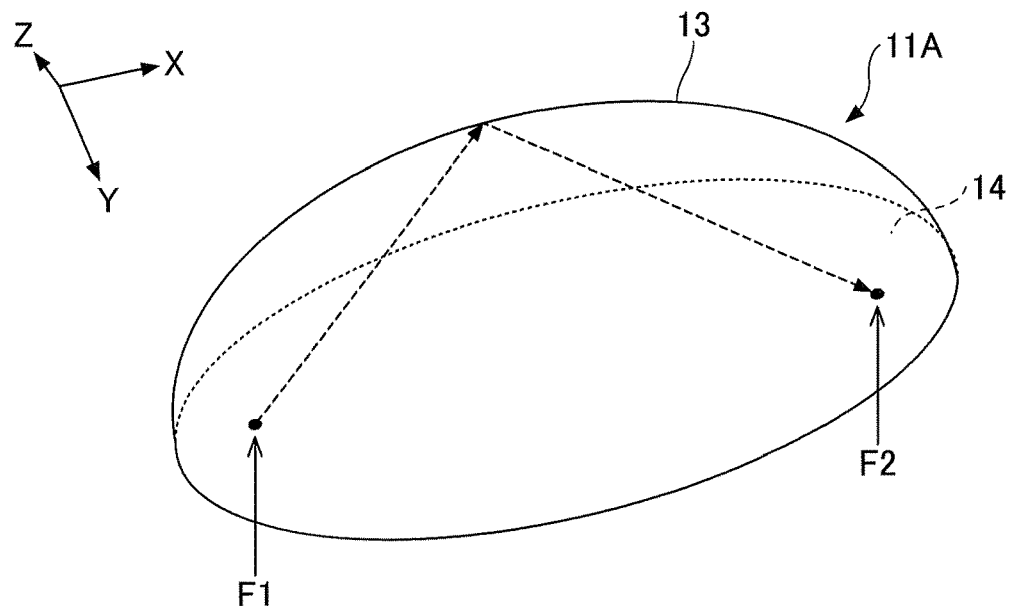
FIG. 2A is a perspective view of an optical cover used in the rain sensor of FIG. 1A and FIG. 1B, viewed from above.
Figure 2B:
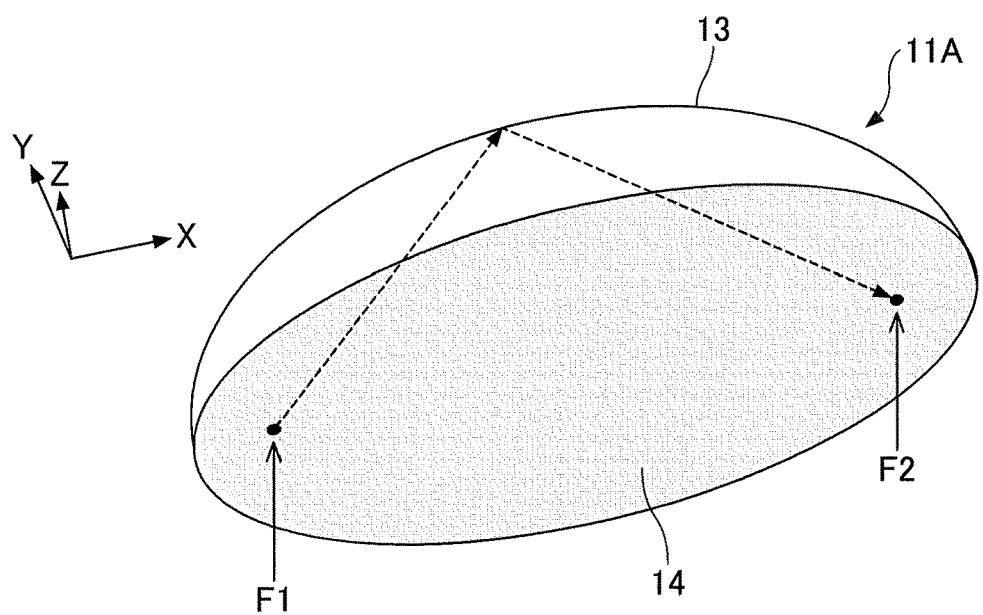
FIG. 2B is a perspective view of the optical cover used in the rain sensor of FIG. 1A and FIG. 1B, viewed from below.

FIG. 2A and FIG. 2B are perspective views of the optical cover 11A of the rain sensor 10A. FIG. 2A is viewed from the direction near the apex of the curved surface 13, and FIG. 2B is viewed from the direction of the bottom face 14. The optical cover 11A may be formed of, for example, a transparent ceramic, glass, a plastic with a high index of refraction, or the like. The optical cover 11A has a first focal point F1 and a second focal point F2 on the bottom face 14. The light emitting device 15 is positioned at one of the first focal point F1 and the second focal point F2, and the photo-receiving device 16 is positioned at the other.

A locus of points on the XY plane at which the total of the distances from the first focal point F1 and the second focal point F2 is constant corresponds to the oval shape of the bottom face 14 of the optical cover 11A. The light emitted from the point light source located at one of the focal points (e.g., the first focal point. F1) of the spheroid is reflected from the curved surface 13 and collected at the other (e.g., the second focal point F2). Accordingly, the light emitting device 15 is provided at one of the focal points (e.g., the first focal point F1), and the photo-receiving device 16 is provided at the other (e.g., the second focal point F2).

When the light emitting device 15 and the photo-receiving device 16 are arranged in the configuration shown in FIG. 1A and FIG. 1B, the light emitting device 15 and the photodiode 15 may be embedded in the optical cover 11A such that the light emitting surface is located at the first focal point F1 and that the photo-receiving surface is located at the second focal point F2. Another configuration, in which the light emitting surface of the light emitting device 15 is located in surface contact with the bottom face 14 of the optical cover 11A at the first focal point F1 and the photo-receiving surface of the photo-receiving device 16 is located in surface contact with the bottom face 14 of the optical cover 11A at the second focal point F2, may be employed.

By shaping the curved surface 13 of the solid optical cover 11A such that the light output from the light emitting device 15 satisfies the conditions of total internal reflection at an interface with air and does not satisfy the conditions of total internal reflection (for example, 90% or more of the light being transmitted) at an interface with a liquid. Based upon a change in the quantity of received light, raindrops falling onto the curved surface can be detected with high sensitivity. Even when used outdoors, the rain sensor 10A is designed to prevent the infrared component of the sunlight from interfering with the infrared light output from the light emitting device 15, as will be described later, and it can detect the presence of raindrops accurately. The rain sensor 10A may be configured such that when an external light source, such as sunlight, is incident on the photo-receiving device 16, the external light is canceled upon photo-detection by comparing the detection result acquired during emission of light with one acquired immediately before the light emission.

Figure 3:
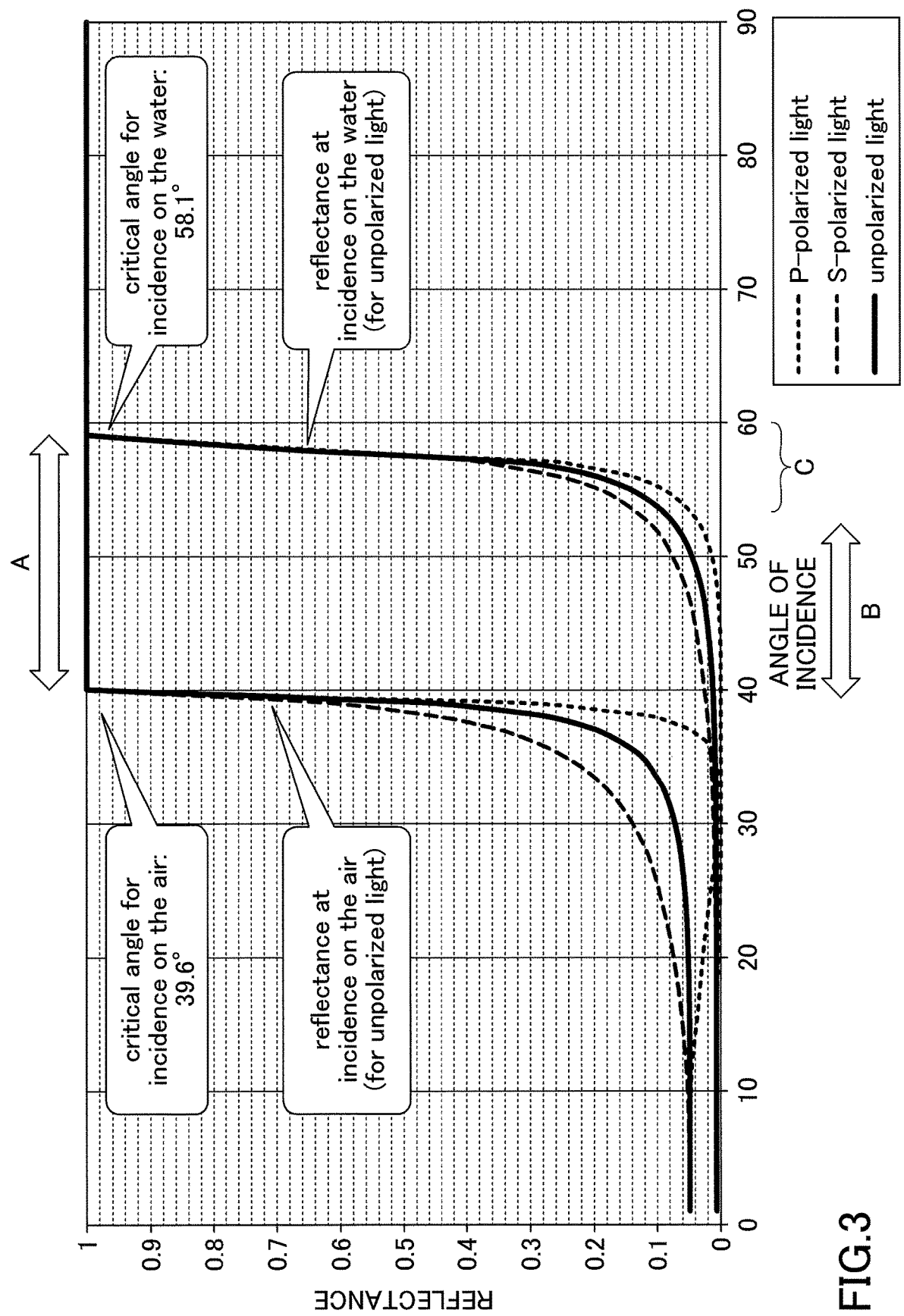
FIG. 3 is a diagram for explaining the basic idea of the rain sensor of the embodiments.

FIG. 3 is a diagram for explaining the basic idea of the rain sensor 10A illustrated in FIG. 1A and FIG. 1B. The shape of the optical cover 11A of the rain sensor 10A optimizes the elliptical optical system, making use of the relationship between the incident angle onto the interface of the spheroid and the reflectance that depends on the index of refraction. The horizontal axis of FIG. 3 represents the incident angle of light output from the light emitting device 15 and entering the interface of the spheroid, and the vertical axis represents the reflectance at the interface. In the figure, the solid curve on the left-hand side is the reflectance at an interface with air, and the solid curve on the right-hand side is the reflectance at an interface with water. The dotted line represents the reflectance of P-polarized light, the dashed line represents the reflectance of S-polarized light, and the solid line represents the reflectance of unpolarized light.

FIG. 3 shows an example using polycarbonate (with an index of refraction of 1.57) as the material of the optical cover 11A, and accordingly, the incident angle dependency of the reflectance of light moving from polycarbonate into the air and the water. The index of refraction of air is 1 (n=1), and the index of refraction of water is 1.33 (n=1.33). The reflectance of light reflected from the interface between substances with different indexes of refraction depends on the incident angle and refractive index difference across the interface (Fresnel reflection).

The critical angle for light moving from the polycarbonate to the air is 39.6°, and the critical angle for light moving from the polycarbonate to water is 58.1°. When detecting a waterdrop or a raindrop by making use of the phenomenon of total internal reflection, it is generally considered that the rain sensor 10A is used in Region A with the incident angle at the interface ranging from 40° to 58°. However, in Region C with the incident angle exceeding 52°, the reflectance of light incident onto the interface with water may not be sufficiently small. In other words, sufficiently high transmittance cannot be achieved at the interface between the polycarbonate optical over and water. Therefore, Region B with the incident angle ranging from 40° to 52° may be used appropriately as the sensing range of the rain sensor 10A, without using Region C in which the sensitivity decreases to some extent due to the influence of Fresnel reflection. Using Region B of the incident angle, the detection sensitivity is improved.

The range of Region B depends on the index of refraction of the material used for the optical cover 11A. Therefore, the material of the optical cover 11A and the shape of the detection area are selected such that the incident angle onto the interface resides in the optimal range that guarantees high-sensitivity for detection.

FIG. 4 is a diagram illustrating use conditions, assuming that a resin with an index of refraction of 1.60 (n=1.60) is used for the optical cover 11A. The critical angle of light incident from the resin onto the air is 38.7°, and the critical angle of light incident from the resin onto water is 56.4°. The range of incident angle $\theta i$ at which raindrops or waterdrops can be detected by making use of the phenomenon of total internal reflection is $38.7° < \theta i < 56.4°$. As illustrated in FIG. 3, the upper limit of $\theta i$ may be set to the angle at which the reflectance becomes 10% (0.1) or less (namely, the transmittance becomes 90% or more) at an interface with the water. In this case, the upper limit of the range of the incident angle range may become several degrees smaller than 56.4°.

Figure 5:
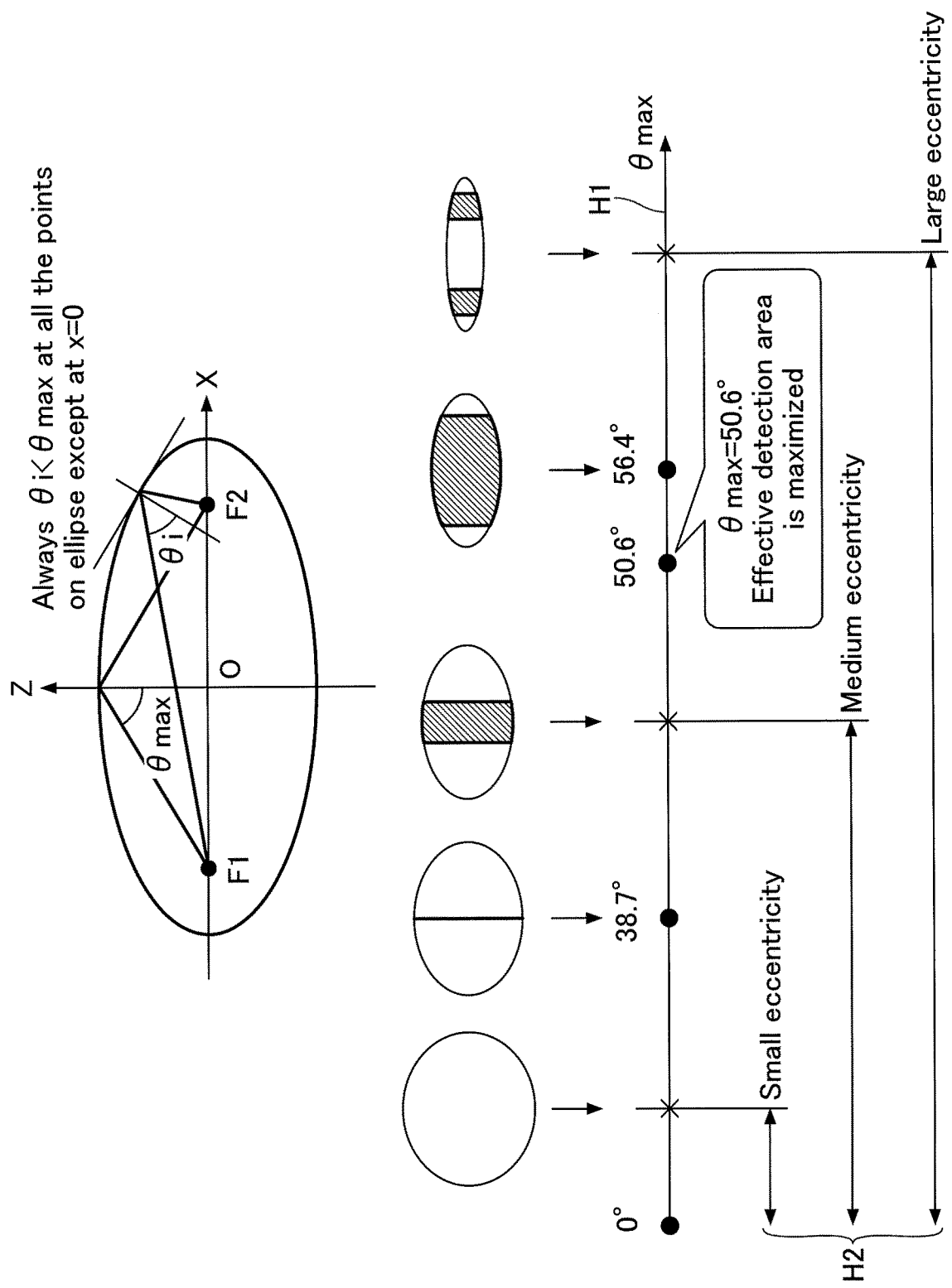
FIG. 5 illustrates the relation between the range of an incident angle and the oval pattern represented by an eccentricity.

FIG. 5 is a diagram illustrating the relationship between the range of incident angles and the elliptical pattern represented by the eccentricity. When the light emitting device 15 and the photo-receiving device 16 are positioned at the focal point F1 and the focal point F2, respectively, of the ellipse as illustrated at the top of FIG. 5, the point on the circumference of the ellipse at which the incident angle $\theta i$ becomes the maximum ($\theta max$) is X=0 (the vertex of the ellipse). At the other points on the circumference, $\theta i$ is always smaller than $\theta max$ ($\theta i < \theta max$).

The middle of FIG. 5 shows the shape of the spheroid in a top plan view or viewed from the Z direction. The shaded area in the ellipse is the effective detection area in which raindrops or water droplets can be detected by the phenomenon of total internal reflection.

The horizontal axis H1 at the bottom of FIG. 5 represents $\theta max$, and the horizontal axis H2 represents the eccentricity of the ellipse. The eccentricity "e" of the ellipse is determined by the ratio of the distance from the center "O" of the ellipse to the focal point F (F1 or F2) to the major axis radius "a" (e=|OF|/a). When the eccentricity is zero, the two focal points coincide at the origin, defining a circle. In such case, the incident angle $\theta i$ becomes zero at any point on the circumference, and the light output from the origin is transmitted through as it is, under the condition of $\theta max=0$.

As the circle is elongated along the X-axis direction (or compressed along the Z-axis), then the eccentricity increases and the positions of the focal points F1 and F2 separate toward the opposite ends of the major axis. In a spheroid or an ellipsoid with a high eccentricity, the effective detection area is separated toward the opposite ends along the X-axis, and a blind region incapable of detecting raindrops using the phenomenon of total internal reflection becomes dominant.

As for the surface area of the effective detection area, it becomes the maximum when the maximum incident angle $\theta max$ is 50.6° assuming that the index of refraction is 1.6 and that the incident angle θi onto the interface ranges from 38.7° to 56.4° (38.7°<θi<56.4°). The curved surface 13 of the optical cover 11A is designed such that the eccentricity meets with the conditions that the detection area exists and that the detection area has a sufficiently large surface area.

Figure 6A:
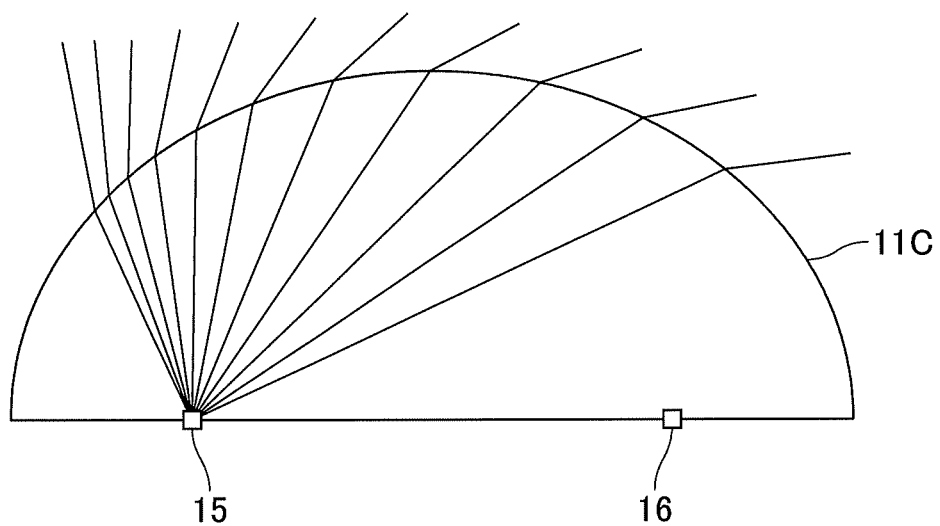
FIG. 6A illustrates the shape of a spheroid having an eccentricity smaller than the optimal range.
Figure 6B:
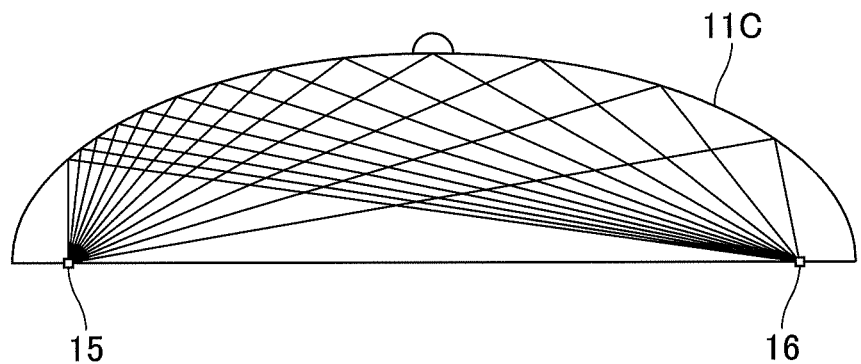
FIG. 6B illustrates the shape of a spheroid having an eccentricity greater than the optimal range.

FIG. 6A and FIG. 6B illustrate a spheroid with the eccentricity out of the appropriate range. FIG. 6A shows the shape of a spheroid with an eccentricity below the predetermined range, and FIG. 6B shows the shape of a spheroid with an eccentricity exceeding the predetermined range.

When the eccentricity of the spheroid is low, as illustrated in FIG. 6A, the angle of incidence onto the interface decreases, and the conditions for total internal reflection are unsatisfied both when the spheroid is in contact with air or with water, and at least a portion of the light passes through the interface. With this configuration, a little difference may arise in reflectance depending on the presence or the absence of water deposition. however, even so, the detection sensitivity is low and deposition of water droplets cannot be accurately detected.

When the eccentricity of the spheroid is high, as illustrated in FIG. 6B, total internal reflection occurs in most of the spheroid both when the spheroid is in contact with air or with water. In this case, deposition of waterdrops cannot be detected by making use of the change in the quantity of received light.

In contrast, the curved surface 13 of the rain sensor 10A of the embodiment is designed in a shape such that the conditions for total internal reflection are broken only when a water droplet sits on the surface. In order to achieve this, the range of the eccentricity that allows the detection of raindrops (or water droplets) making use of the phenomenon of total internal reflection is specified.

Figure 7:
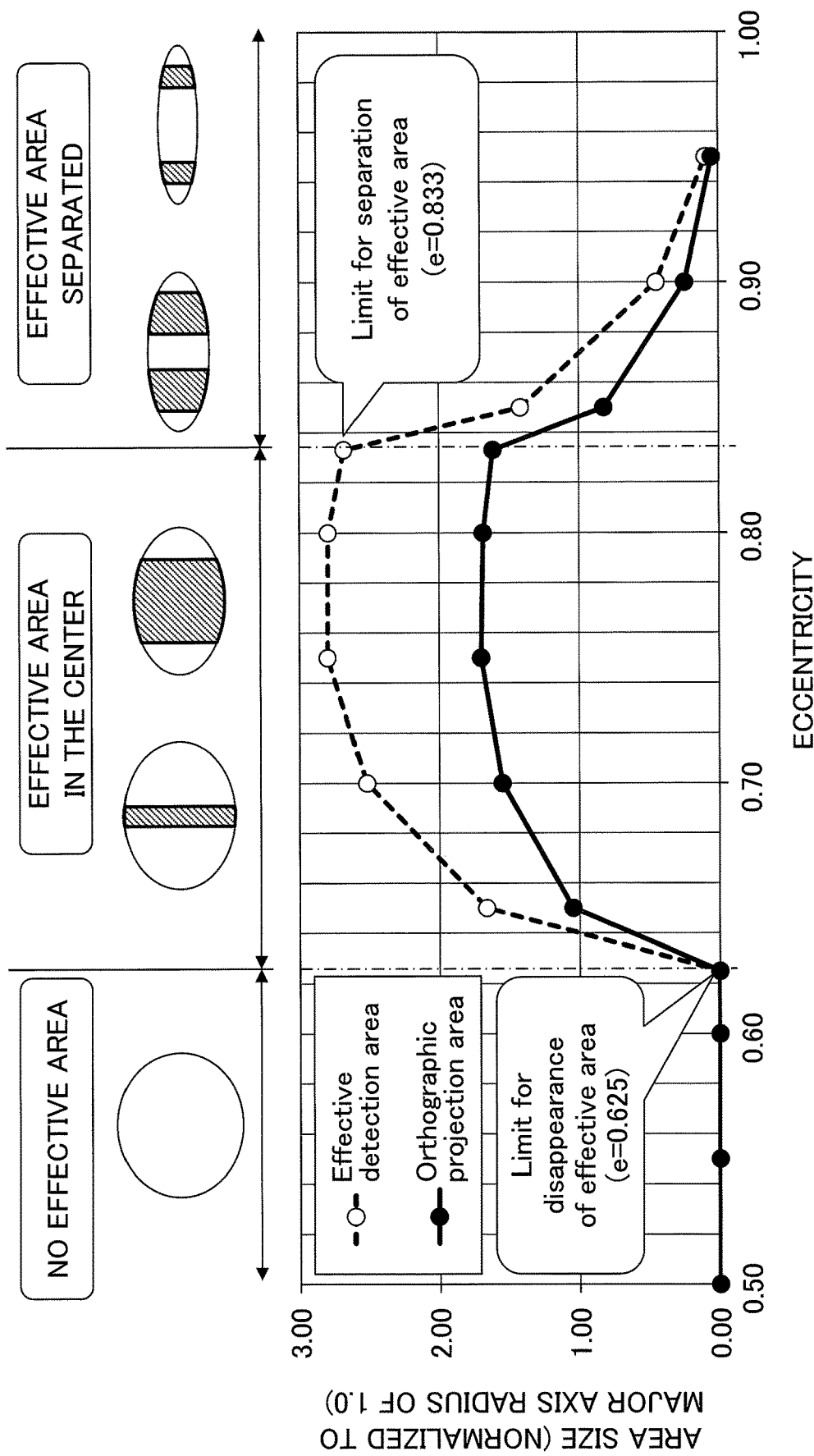
FIG. 7 illustrates the relation between eccentricity and effective area.

FIG. 7 illustrates the relationship between the eccentricity and the effective area, with index of refraction of 1.60. In the embodiment, the index of refraction of "1.60" refers to the refractive index with respect to the near infrared wavelength, and it involves the range 1.60±0.01 taking fluctuation in the light source wavelength, variation in material of the spheroid, the error in measurement, etc. into account. The horizontal axis of FIG. 7 represents eccentricity, and the vertical axis represents area of the effective detection area. The area of the vertical axis is normalized so that the major axis radius is "1". Two types of area are indicated, the surface area (represented by the broken line) and the orthogonal projection area (represented by the solid line). As for the rain sensor 10A, rain generally falls from above or obliquely. Seen from the rain falling from directly above, the effective area becomes the orthogonal projection area.

When the index of refraction of the spheroid is 1.60, the effective detection area becomes the maximum within the range 0.75 to 0.8 of eccentricity for both the surface area and the orthogonal projection area. With the eccentricity of 0.60 or less, there is no effective detection area present, and the entirety of the area becomes "non-total reflection areas". As described earlier with reference to FIG. 6A, in the "non-total reflection area", a small difference in reflectance may be observed depending on whether the spheroid is in contact with the air or the water at the interface; however, the detection sensitivity is low.

When the eccentricity is in the range of 0.833 to 0.95, the effective detection area exists, but it is divided on the spheroid. Even though the effective detection area is divided, water droplets can be still detected. With the eccentricity of 0.95 or more, the area in which light is totally reflected at the interface, regardless of whether the spheroid is in contact with the air or the water, becomes dominant and the effective detection area decreases. More specifically, a blind area occurs in the central part of the optical cover 11A, and the blind area expands as the eccentricity increases. Simultaneously, the effective detection areas become narrower, and are moved toward far ends of the optical cover 11A.

From FIG. 7, the available range of eccentricity is 0.625 to 0.95 when the index of refraction is 1.60±0.01. From the viewpoint of widening the effective detection area, it is more desirable to select the range of the eccentricity from 0.65 to 0.85.

Figure 8A:
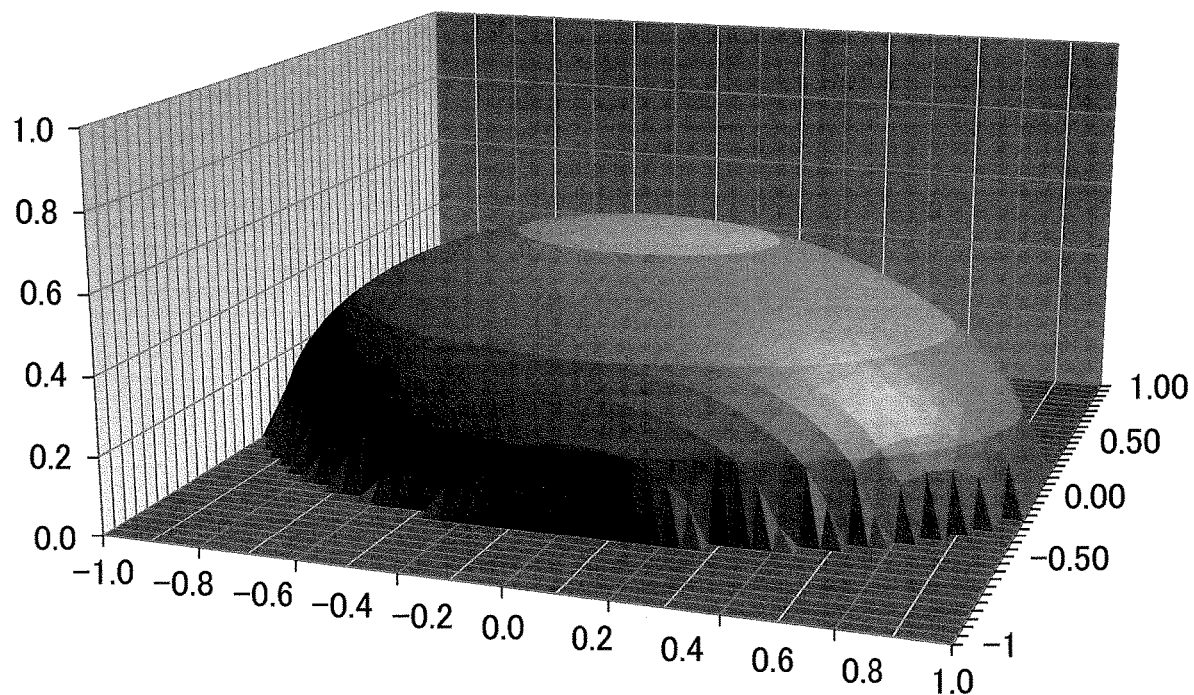
FIG. 8A illustrates the shape of spheroid with an index of refraction of 1.60 and with the maximum size of the effective detection area.
Figure 8A:
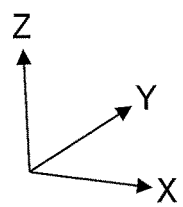
Figure 8B:
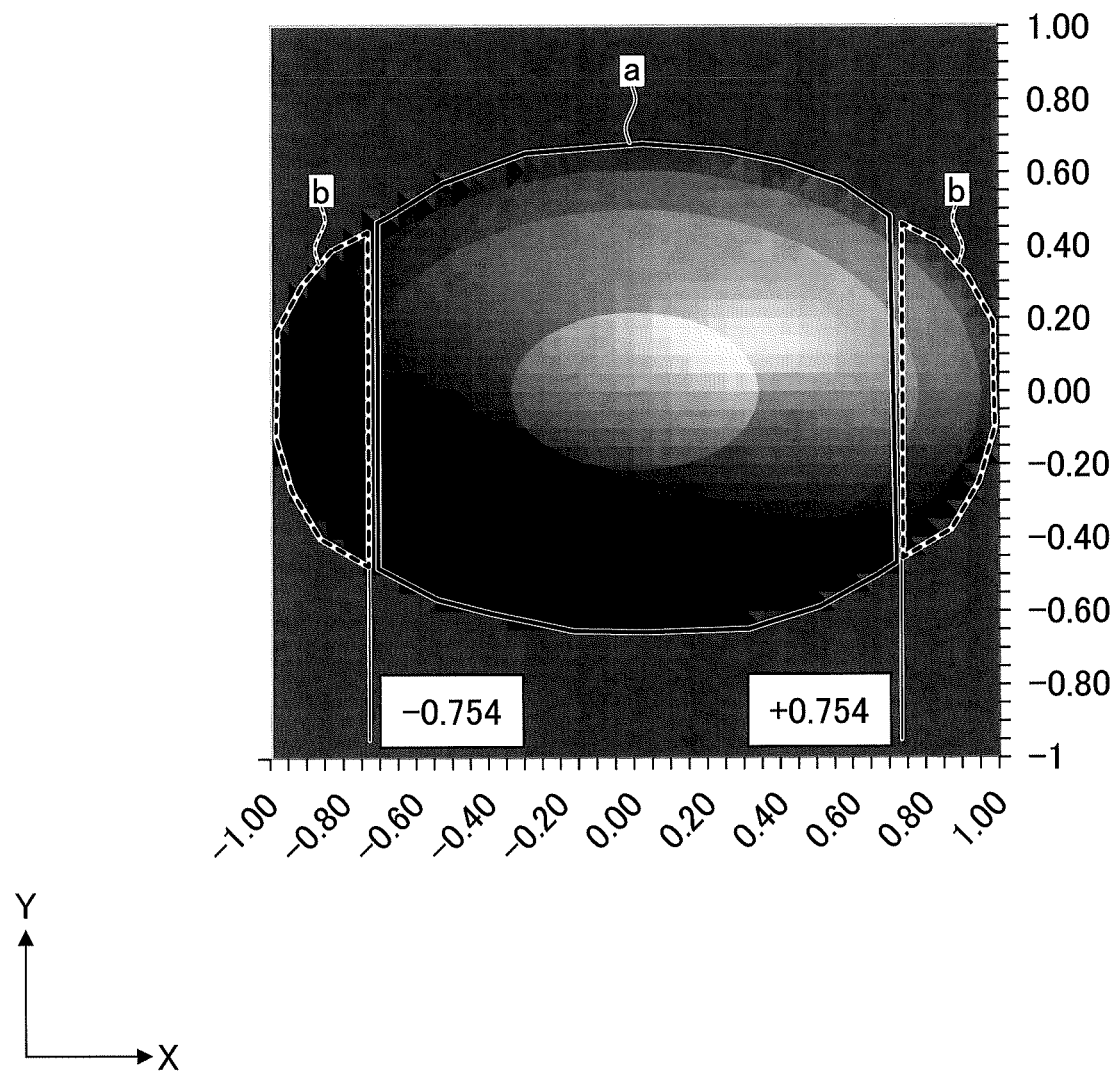
FIG. 8B illustrates in an overhead view of the effective detection area of the spheroid of FIG. 8A.

FIG. 8A to FIG. 8C show the shape and specifications of the spheroid with the index of refraction of 1.60 when the effective detection area becomes the maxim. FIG. 8A is a three-dimensional image of a spheroid, FIG. 8B is an overhead view of the spheroid, and FIG. 8C is a table of specifications of this example indicated by normalized values and actual values.

The three axes in FIG. 8A and the two axes in FIG. 8B are scaled by normalized values. When the effective detection area is maximized, the effective detection area "a" is located at the center of the spheroid, as illustrated in FIG. 8B. Within the effective detection area "a", the light traveling through the spheroid is totally reflected from the interface with air, but it is not totally reflected from the interface with water. The end parts of the spheroid are invalid areas "b". In the invalid area "b", total internal reflection does not occur regardless of whether the spheroid is in contact with the water or the air.

The size of the effective detection area becomes the maximum when the eccentricity is 0.773 with the index of refraction of 1.60. With the major axis radius normalized to 1, the normalized minor axis radius is 0.634, the effective surface area is 2.82, and the orthogonal projection area is 1.71. In FIG. 8B, with the major axis radius normalized to 1, the normalized effective detection area along the major axis rages from −0.754 to +0.754.

With the actual values of this example, the major axis radius is 30 mm, the minor axis radius is 19.0 mm, the effective surface area is 2540 mm$^2$, and the orthogonal projection area is 1540 mm$^2$.

Figure 9A:
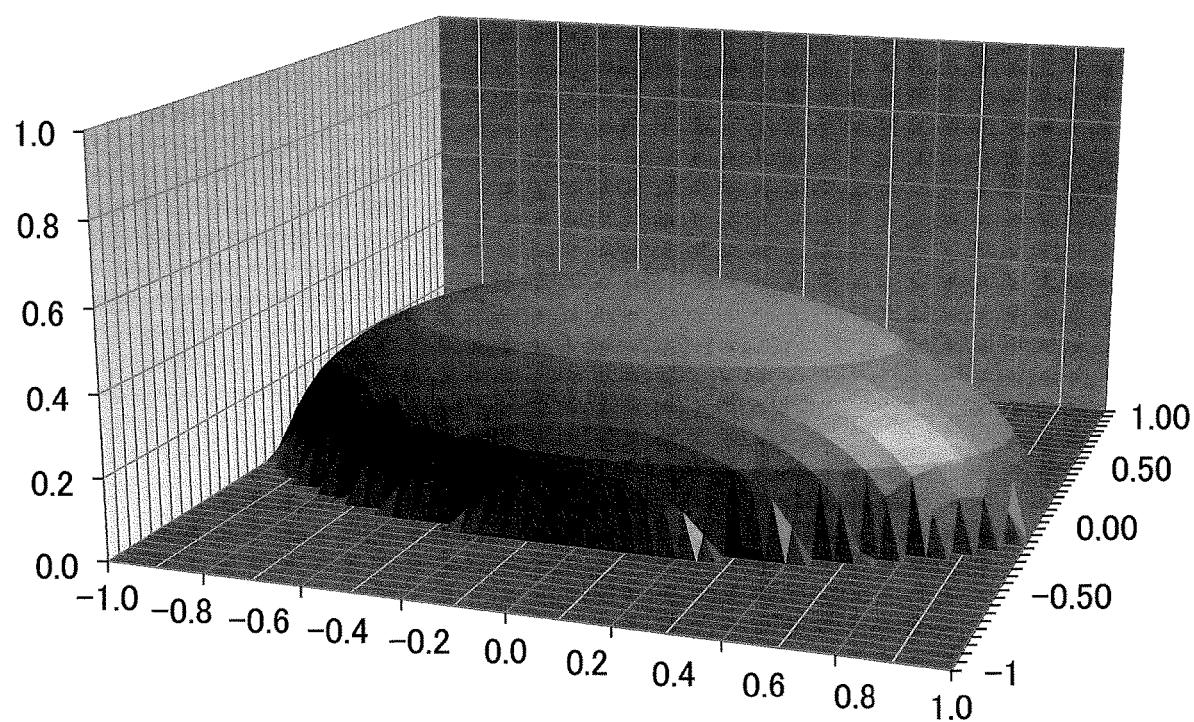
FIG. 9A illustrates the shape of a spheroid having an index of refraction of 1.60 and a high eccentricity.
Figure 9B:
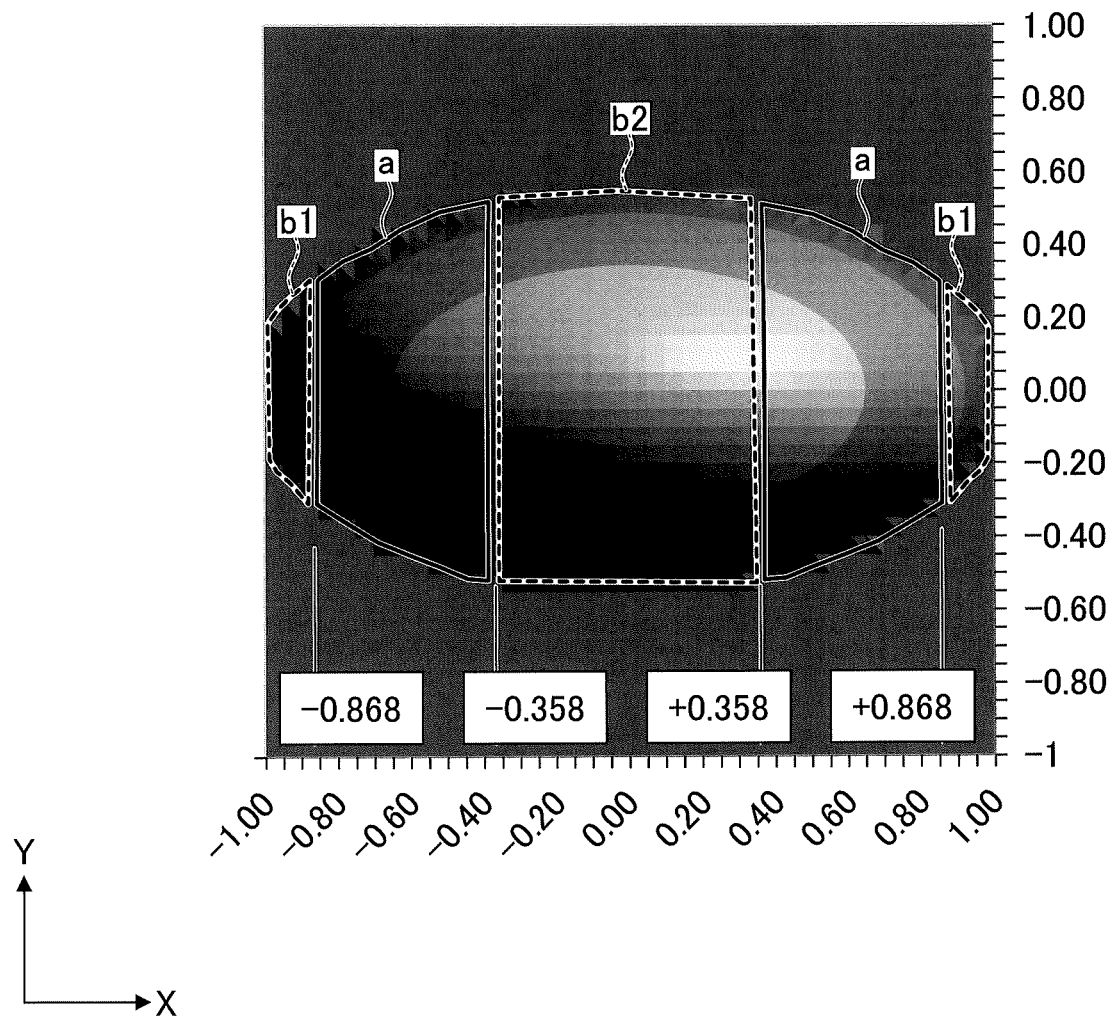
FIG. 9B illustrates in an overhead view the effective detection area of the spheroid of FIG. 9A.

FIG. 9A to FIG. 9C show the shape and specifications of the spheroid with the index of refraction of 1.60, where the eccentricity is greater than that in FIG. 8A. FIG. 9A is a three-dimensional image of a spheroid, FIG. 9B is an overhead view of the spheroid, and FIG. 9C is a table of specifications indicated by normalized values and the actual values of this example.

The three axes in FIG. 9A and the two axes in FIG. 9B are scaled by normalized values. When the eccentricity increases, the effective detection areas "a" are located separately at the opposite ends of the spheroid, as illustrated in FIG. 9B. In this state, the total size of the effective detection areas "a" is sufficient for the application to water droplet sensors. Within the effective detection areas "a", the light traveling through the spheroid is totally reflected from the interface with air, but it is not totally reflected from the interface with water. The central part and the far ends of the spheroid are invalid areas. In the invalid areas "b1" at the opposite ends, total internal reflection does not occur regardless of whether the spheroid is in contact with the water or the air. In the invalid area "b2" at the center, total internal reflection occurs in the case where the spheroid is in contact with air or with water.

When the eccentricity is set to 0.850 with the index of refraction of 1.60 and with the major axis radius normalized to 1, then the minor axis radius is 0.527, the effective surface area is 1.42, and the orthogonal projection area is 0.823. In FIG. 9B with the major axis radius normalized to 1, the range of |x| of the effective detection area "a" along the major axis direction is 0.358<|x|<0.863.

Using the actual values in this example, the major axis radius is 30 mm, the minor axis radius is 15.8 mm, the effective surface area is 1280 mm, and the orthogonal projection area is 741 mm$^2$.

Compared with FIG. 8C, both the effective surface area and the orthogonal projection area are reduced to about half, but raindrops or water droplets can still be detected using the effective detection area "a". However, when the eccentricity exceeds 0.95, there is almost no effective detection area, and the rain sensor does not function efficiently.

Figure 10A:
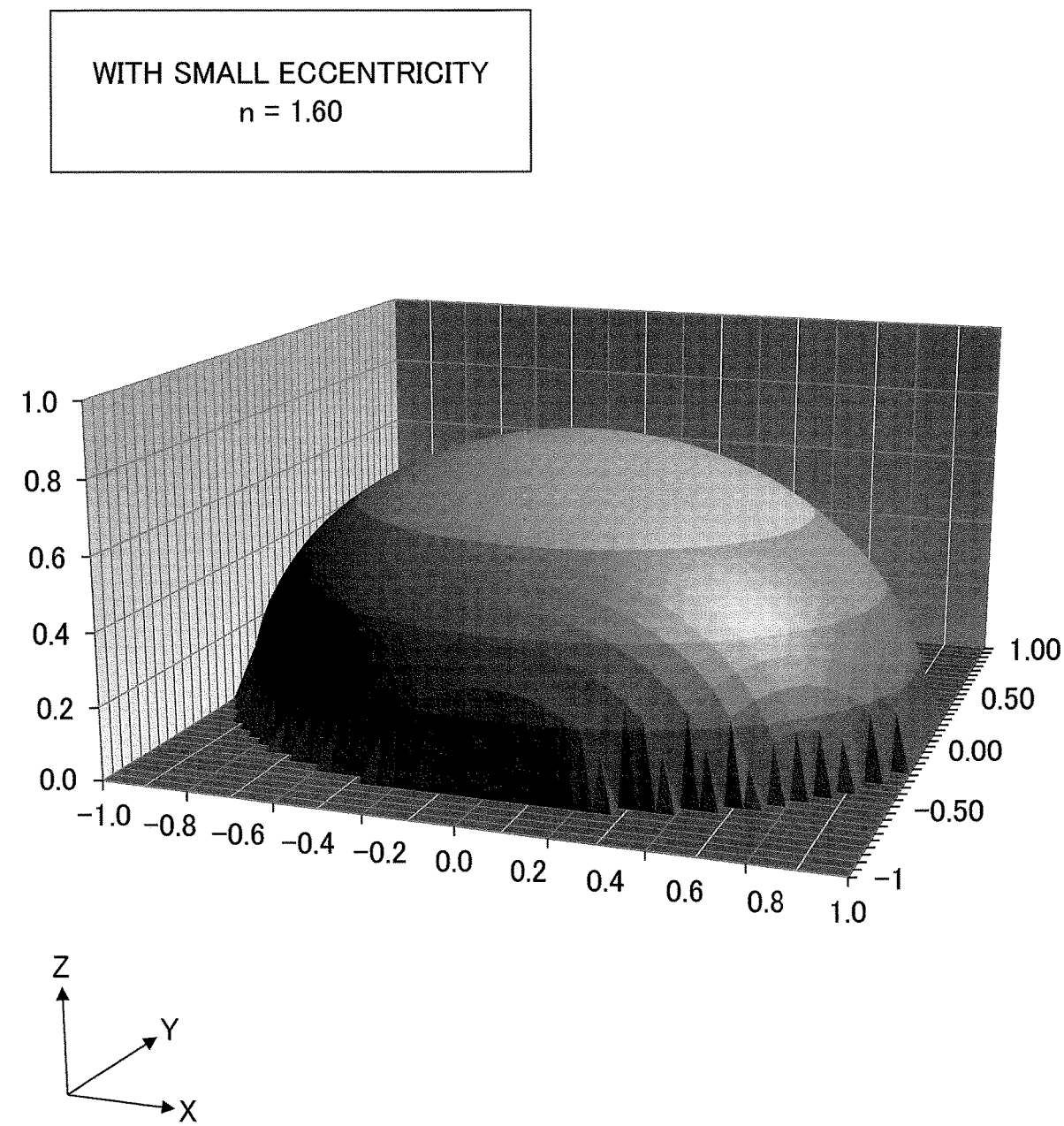
FIG. 10A illustrates the shape of a spheroid with an index of refraction of 1.60, and with a small eccentricity.
Figure 10B:
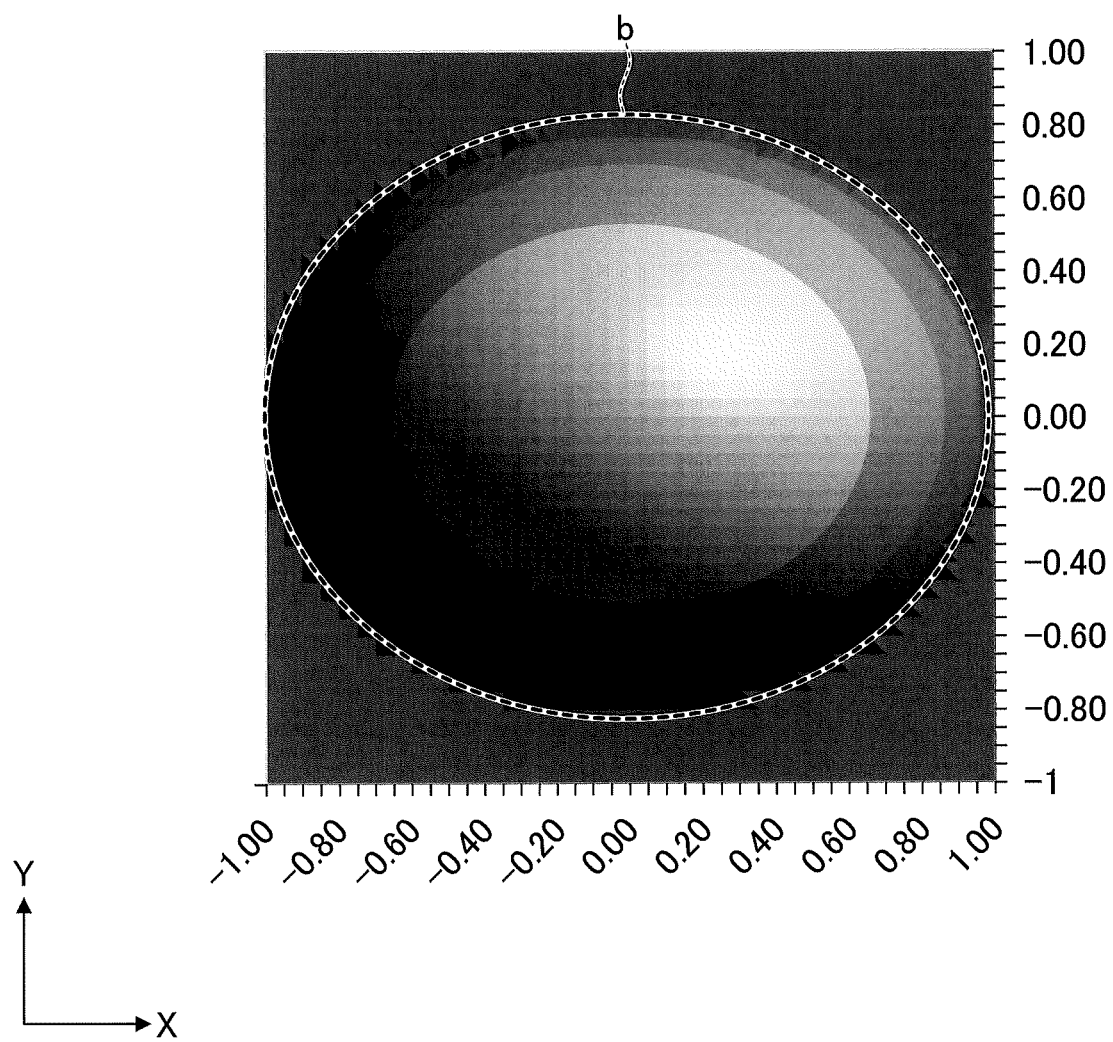
FIG. 10B illustrates in an overhead view the effective detection area of the spheroid of FIG. 10A.

FIG. 10A to FIG. 10C show the shape and specifications of the spheroid with the index of refraction of 1.60, where the eccentricity is lower than that in FIG. 8A. FIG. 10A is a three-dimensional image of a spheroid, FIG. 10B is an overhead view of the spheroid, and FIG. 10C is a table of specifications indicated by normalized values and the actual values of this example.

The three axes in FIG. 10A and the two axes in FIG. 10B are scaled by normalized values. When the eccentricity is below a predetermined value, no effective detection area exists, as illustrated in FIG. 10B. In this example, the eccentricity is 0.600, and the shape of the spheroid is closer to a hemisphere.

When the eccentricity is set to 0.600 with the index of refraction of 1.60 and with the major axis radius normalized to 1, then the minor axis radius is 0.800. Using the actual values in this example, the major axis radius is 30 mm, the minor axis radius is 24 mm. Because no effective detection area is acquired, both the surface area and the orthogonal projection area are zero.

In this manner, an appropriate range of eccentricity is specified when the optical cover 11A is formed of a material with the index of refraction of 1.60, and the shape of the curved surface 13 is determined. Because the range of suitable eccentricity depends on the index of refraction of the material, appropriate ranges of eccentricity are specified below for different indexes of refraction.

Figure 11A:
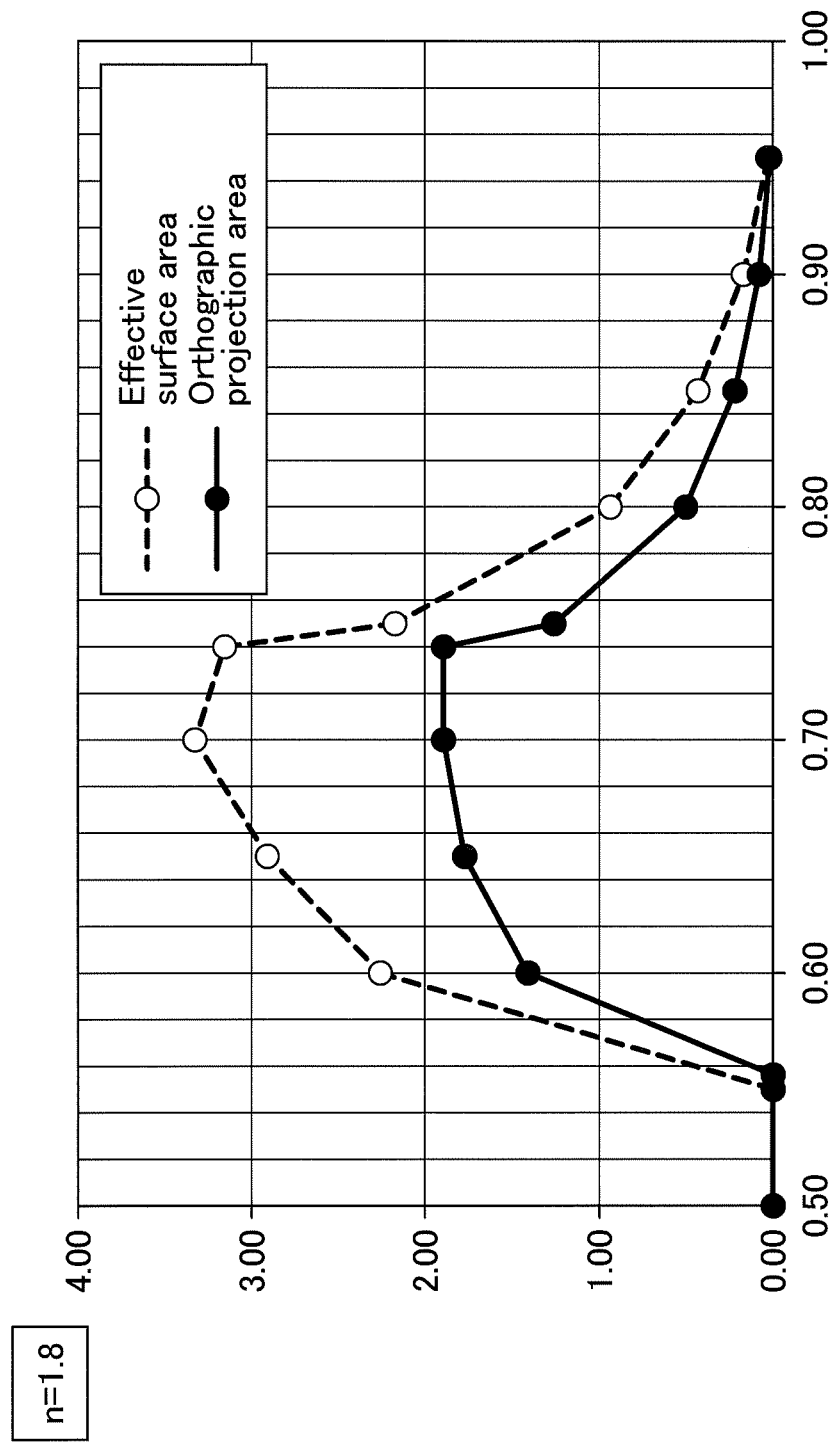
FIG. 11A illustrates eccentricity dependency of effective area when the index of refraction is 1.8.
Figure 11C:
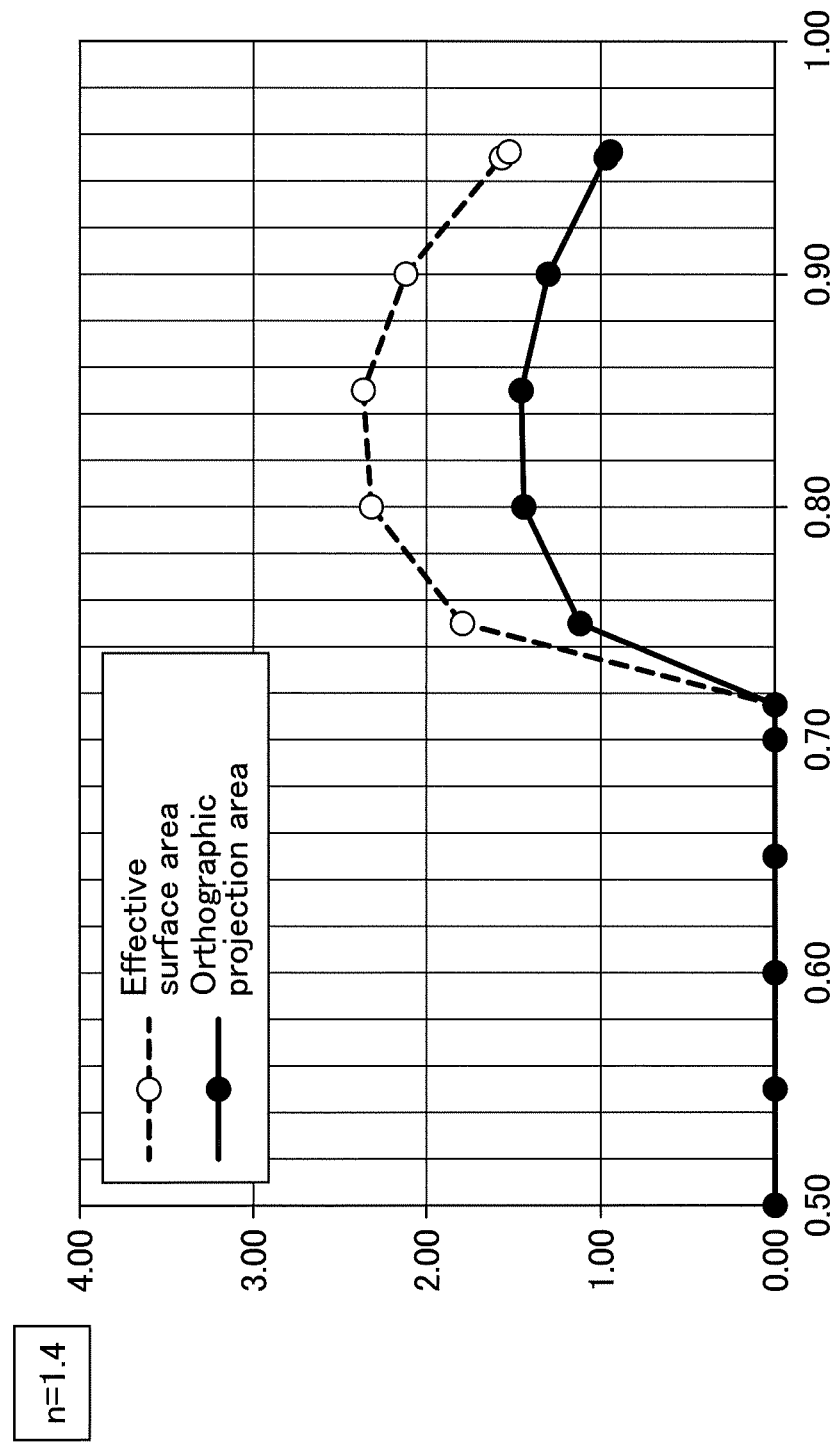
FIG. 11C illustrates eccentricity dependency of effective area when the index of refraction is 1.4.

FIG. 11A to FIG. 11C illustrate the relationships between the eccentricity and the effective area with different indexes of refraction. FIG. 11A shows the eccentricity dependency of the effective area when index of refraction is 1.8, FIG. 11B shows the eccentricity dependency of the effective area when the index of refraction is 1.6, and FIG. 11C shows the eccentricity dependency of the effective area when the index of refraction is 1.4. In FIG. 11A to FIG. 11C, the indexes of refraction of "1.8" and "1.4" refer to those with respect to near-infrared light and involve the errors of 1.8±0.01 and 1.4±0.01.

In FIG. 11A, FIG. 11B, and FIG. 11C, both the surface area and the orthogonal projection area are indicated as the effective area. In the figures, the surface area of the effective detection area is indicated by the dashed line and labeled as "effective detection area".

From FIG. 11A to FIG. 11C, with decreases in the index of refraction of the optical cover 11A (which means that the difference from the indexes of refraction of the air and the water becomes smaller), the range of the appropriate eccentricity is broadened. When a material having a smaller index of refraction is used, the effective area can be increased by selecting a greater eccentricity. On the other hand, a greater index of refraction allows the absolute size of the effective area to be increased.

In FIG. 11A with the index of refraction of 1.8±0.01, the optical cover 11A is designed such that the eccentricity "e" is greater than 0.556 and less than or equal to 0.9 (0.556<e≤0.9). When the index of refraction exceeds 1.8, the eccentricity may decrease as small as 0.55. A sufficiently wide effective detection area can be secured with a lower eccentricity.

In FIG. 11B with the index of refraction of 1.6±0.01, the optical cover 11A is designed such that the eccentricity "e" is greater than 0.625 and less than or equal to 0.95 (0.625<e≤0.95).

In FIG. 11C with the index of refraction of 1.4±0.01, the optical cover 11A is designed such that the eccentricity "e" greater than 0.714 (0.714<e).

When a material having an index of refraction of 1.4 to 1.8 is used for the optical cover 11A, it is desirable to select an eccentricity from the range greater than 0.7 and less than or equal to 0.95. Because, in general, the material of the optical cover 11A is known, a suitable range of the eccentricity may be selected in accordance with the index of refraction of the material to be used. In this case, an eccentricity that maximizes the effective detection area may be selected. Alternatively, depending on the how and where the rain sensor 10A is used, it is unnecessary to always select the eccentricity that maximizes the effective area, as long as the eccentricity resides within the predetermined range. For example, a pattern in which the effective detection area is divided into two may be selected.

Figure 12:
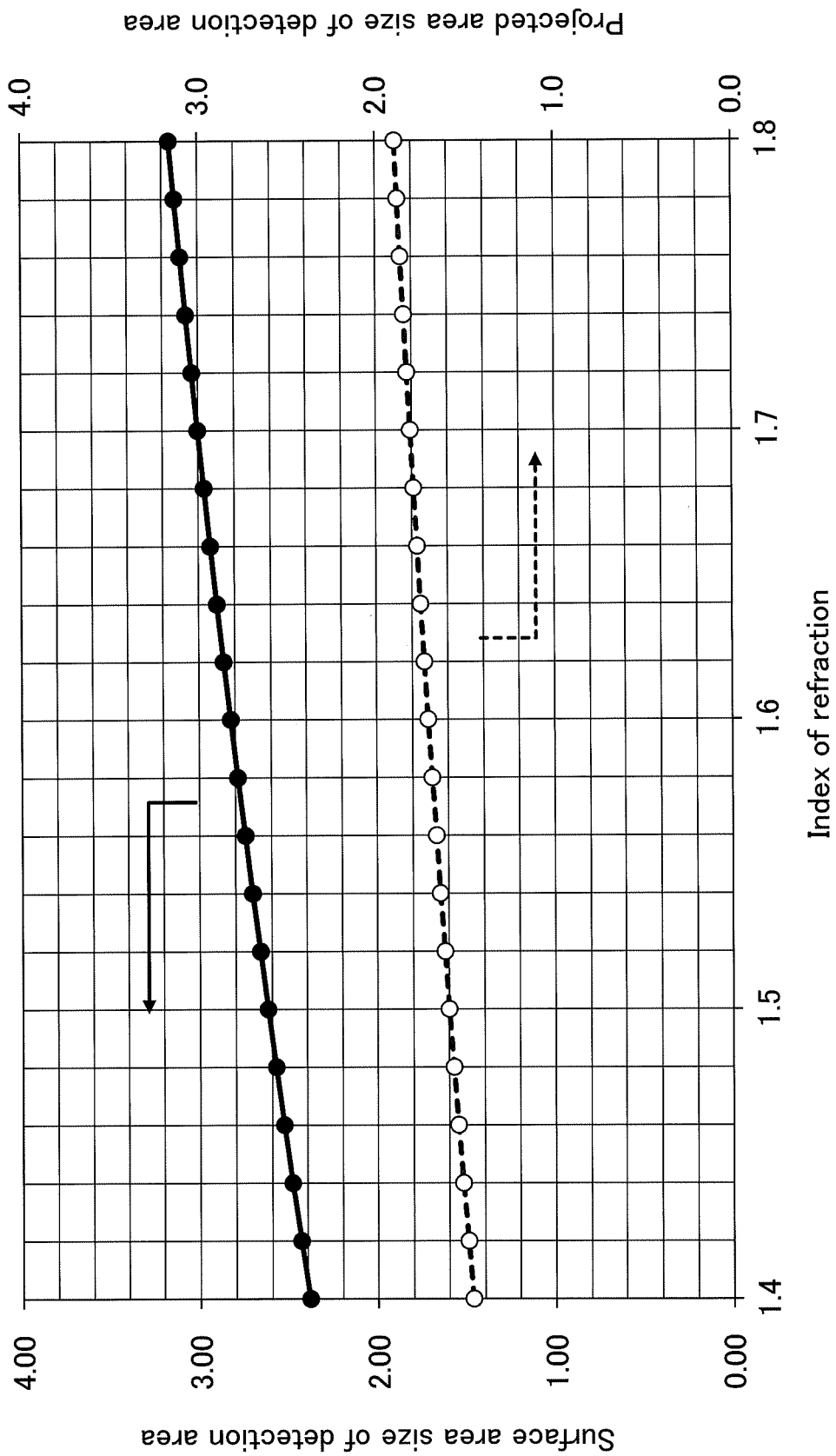
FIG. 12 illustrates refractive index dependency of surface area and orthographic area image when the eccentricity is optimized such that the surface area of the effective detection area becomes the maximum.

FIG. 12 illustrates dependency of the surface area and the orthogonal projection area on index of refraction where the eccentricity is optimized so as to maximize the surface area of the effective detection area. In the figure, the vertical axis of the left-hand side and the black circle data points represent the surface areas, and the vertical axis of the right-hand side and the white circle data points represent the orthogonal projection areas, both of which are normalized with the major axis radius being 1.

As illustrated in FIG. 12, the greater the index of refraction of the optical cover 11A, the greater the surface area and the orthogonal projection area of the effective detection area. For example, comparing acrylic resin and polycarbonate, the index of refraction of acrylic resin with respect to near infrared light is 1.485 and that of polycarbonate with respect to near infrared light is 1.57. By forming the optical cover 11A with polycarbonate, the size of the effective detection area can be increased. When a high-density, high-polarizability organic polymer is used, the index of refraction with respect to near infrared light is around 1.8. Even when an inexpensive resin material with a low index of refraction is used, an eccentricity that provides a sufficient extent of effective detection area can selected for that resin material. Thus, raindrops can be detected accurately based upon a change in the quantity of received light.

Figure 13A:
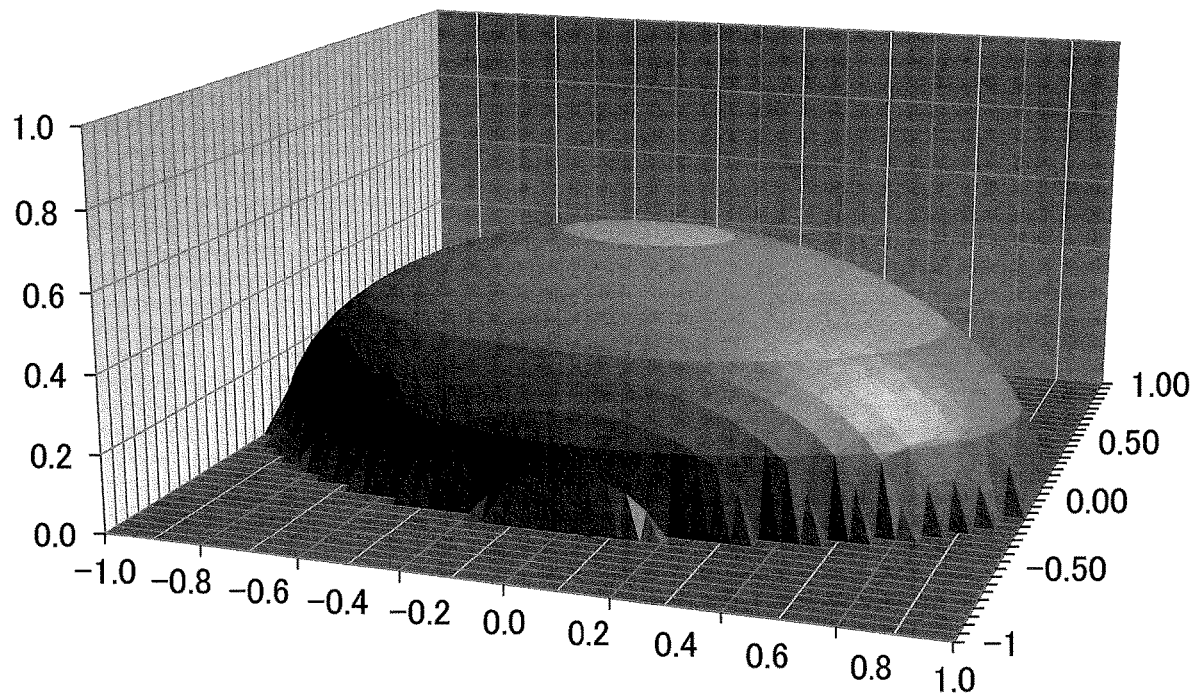
FIG. 13A illustrates the shape of a spheroid that maximizes the effective detection area when the index of refraction is 1.57.
Figure 13B:
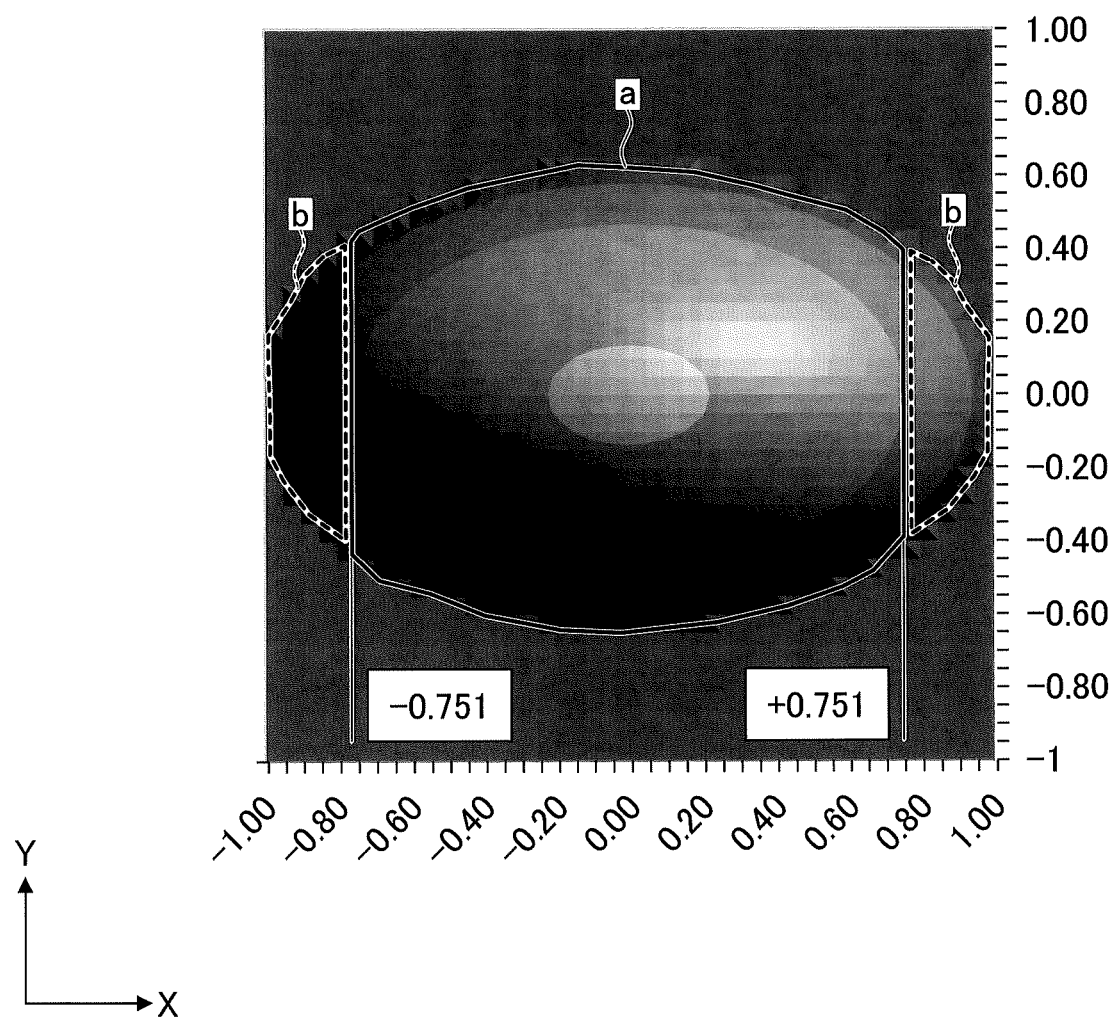
FIG. 13B illustrates in an overhead view the effective detection area of the spheroid of FIG. 13A.

FIG. 13A to FIG. 13C show the shape and specifications of the spheroid, where the index of refraction is 1.60 and the eccentricity is optimized so as to maximize the effective detection area. FIG. 13A is a three-dimensional image of a spheroid, FIG. 13B is an overhead view of the spheroid, and FIG. 13C is a table of specifications indicated by normalized values and the actual values of this example.

The three axes in FIG. 13A and the two axes in FIG. 13B are scaled by normalized values. When the effective detection area is maximized, the effective detection area "a" extends over almost the entire area, except the end parts along the major axis of the spheroid. In the effective detection area "a", the light traveling through the spheroid is totally reflected from the interface with air and is not totally reflected from the interface with water. Opposite ends of the spheroid are invalid areas "b". In the invalid area "b", no total internal reflection occurs regardless of whether the spheroid is in contact with water or air.

With the index of refraction of 1.57, the effective detection area becomes the maximum when the eccentricity is 0.781. With the major axis normalized to 1, the normalized value of the minor axis radius is 0.625, the effective surface area is 2.77, and the orthogonal projection area is 1.68. In FIG. 13B, with the major axis radius normalized to 1, the range of the effective detection area along the major axis is −0.751 to +0.751.

As to the actual sizes, when the major axis radius is 30 mm, then the minor axis radius is 18.7 mm, the effective surface area is 2490 mm$^2$, and the orthogonal projection area is 1510 mm$^2$.

In the simulations of FIG. 13A to FIG. 13C, an eccentricity is selected, corresponding to the incident angle θmax that maximizes the effective area. Accordingly, the same effect as selecting Region B in FIG. 3, in which the difference in reflectance becomes sufficiently large between incidence on the air and incidence on the water, can be achieved.

When the index of refraction is 1.57, the shape that maximizes the effective detection area as defined in FIG. 13A to FIG. 13C is used. The maximum angle of incidence on the elliptical surface is about 51°. At this incident angle, the reflectance decreases to as low as about 5% upon deposition of waterdrops onto the surface, even taking the influence of Fresnel reflection into consideration, and almost no degradation arises in sensitivity. Therefore, with the index of refraction of 1.57, the optimized shape will become one similar to that with the effective detection area shown in FIG. 13A to FIG. 13C, even when the influence of Fresnel reflection is taken into consideration.

Variation 1

FIG. 14A to FIG. 18B illustrate a configuration of a rain sensor 10B which is a first variation of the rain sensor 10A. The rain sensor 10B has air cavities around the first focus F1 and the second focus F2 inside the solid optical cover 11B.

Figure 14A:
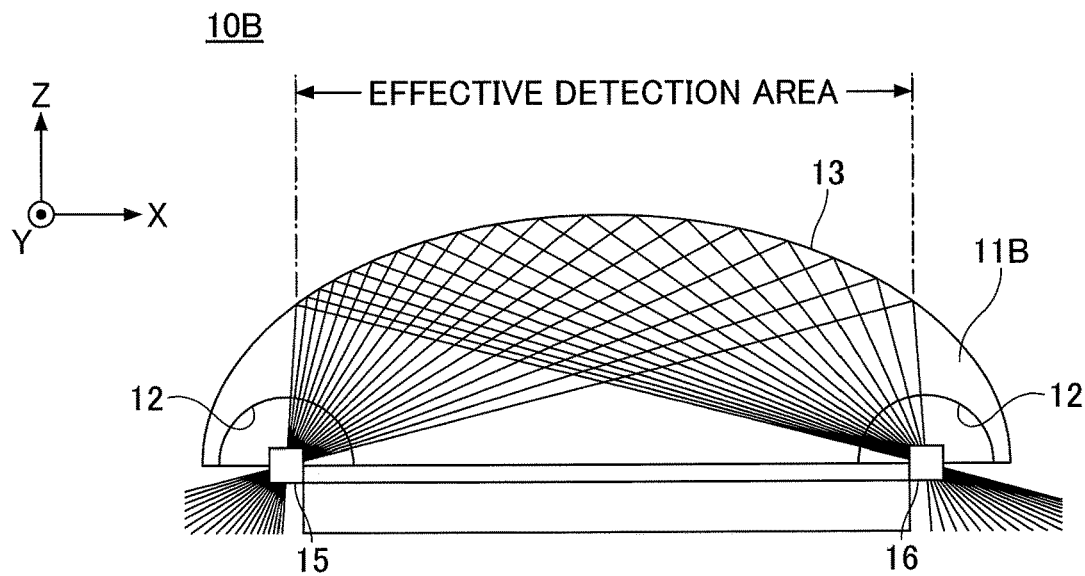
FIG. 14A illustrates a rain sensor of the first variation without a raindrop sitting on it.
Figure 14B:
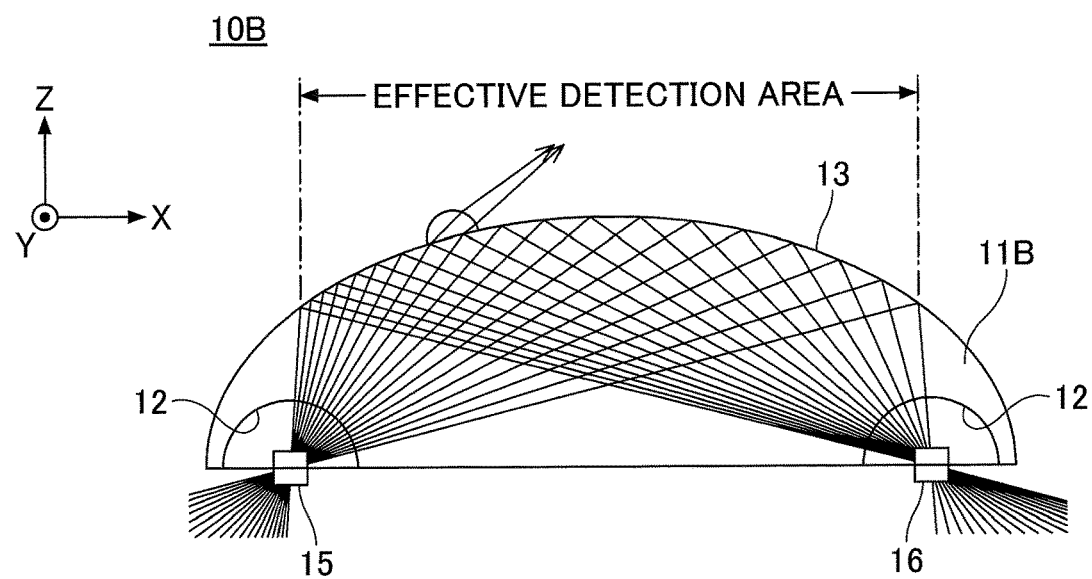
FIG. 14B illustrates a rain sensor of the first variation with a raindrop sitting on it.

FIG. 14A and FIG. 14B illustrate the basic configuration of the rain sensor 10B. The rain sensor 10B includes an optical cover 11B having a curved surface 13, a light emitting device 15 positioned at a first point facing the curved surface 13, and a photo-receiving device 16 positioned at a second point facing the curved surface 13.

The optical cover 11B is a solid cover that forms a part of a spheroid, and it has cavities 12 at positions corresponding to the focal points. The cavities 12 have a spherically hollowed shape. The interface between each of the cavities 12 and the optical cover 11B is a spherical plane.

The light emitting device 15 and the photo-receiving device 16 are provided inside the associated cavities 12. At the spherically-shaped interface between the cavity 12 and the optical cover 11B, refraction can be avoided when the light output from the light emitting device 15 is incident on the optical cover 11B, or when the light totally reflected from the curved surface of the optical cover 11B is received through the cavity 12 at the photo-receiving device 16. This configuration can advantageously make use of the property of an ellipse having two focal points.

As in the above-described embodiment, the curved surface 13 of the optical cover 13B is designed such that a sufficiently wide effective detection area is secured.

Without raindrops on the surface of the rain sensor 10B as illustrated in FIG. 14A, the light output from the light emitting device 15 and incident on the curved surface 13 within the effective detection area is totally reflected from the curved surface 13 and detected by the photo-receiving device 16. Upon deposition of raindrops onto the surface of the rain sensor 10B, the conditions of total internal reflection are broken at the interface between the optical cover 11B and the liquid, and therefore, the quantity of light received at the photo-receiving device 16 decreases. By monitoring the change in the quantity of light received by the photo-receiving device 16, the presence and the amount of rain can be determined.

Figure 15A:
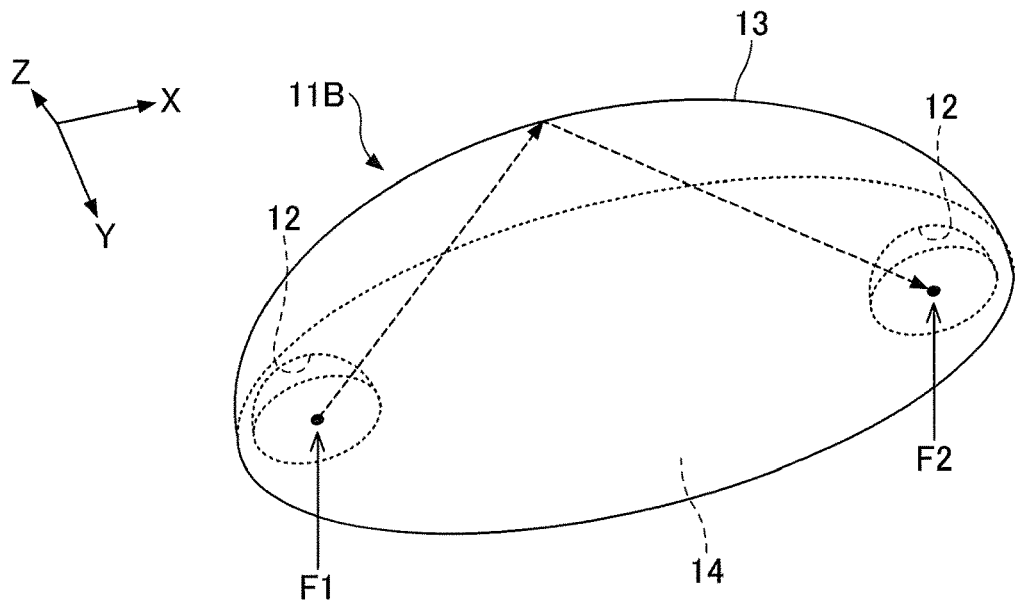
FIG. 15A is a perspective view of an optical cover used in the rain sensor of FIG. 14A and FIG. 14B, viewed from above.
Figure 15B:
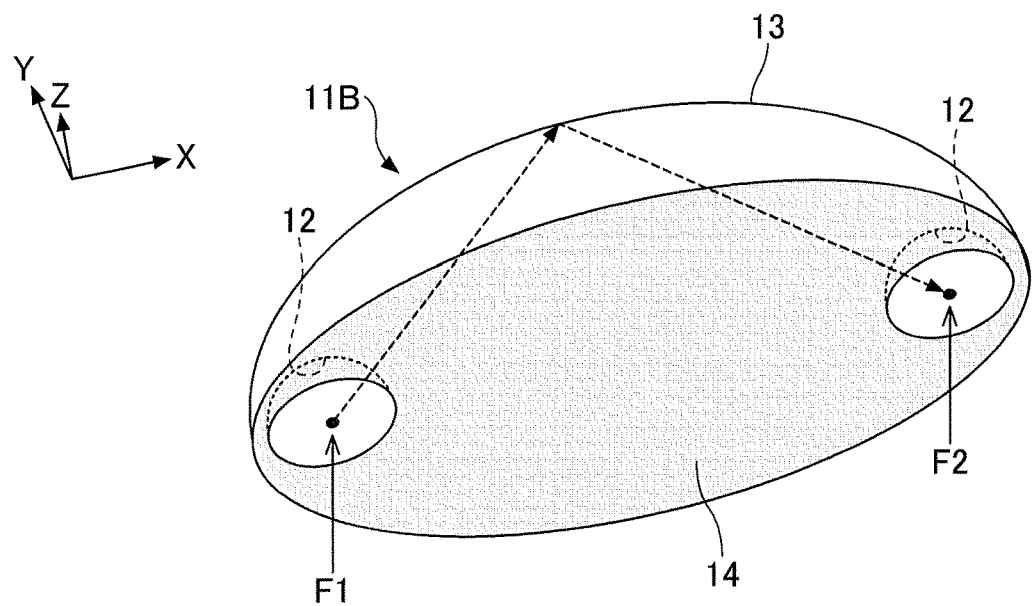
FIG. 15B is a perspective view of the optical cover used in the rain sensor of FIG. 14A and FIG. 14B, viewed from bellow.

FIG. 15A and FIG. 15B are perspective views of the optical cover 11B of the rain sensor 10B. FIG. 15A is viewed obliquely from the apex side or the curved surface 13. FIG. 15B is viewed obliquely from the bottom face 14. The optical cover 11B is made of a material transparent to the wavelength in use, whose index of refraction is known.

The optical cover 11B has a first focal point F1 and a second focal point F2 on the bottom face 14, and hemispherical cavities 12 are provided around the first focal point F1 and the second focal point F2. Owing to the spherical shape of the cavities 12, light entering the optical cover 11B from the cavity 12 and light moving from the optical cover 11B to the cavity 12 can be prevented from refracting at the interface. The basic property of the rain sensor 10B, namely, emitting light from one of the focal points of an ellipses and colleting light at the other focal point can be maintained.

Figure 16:
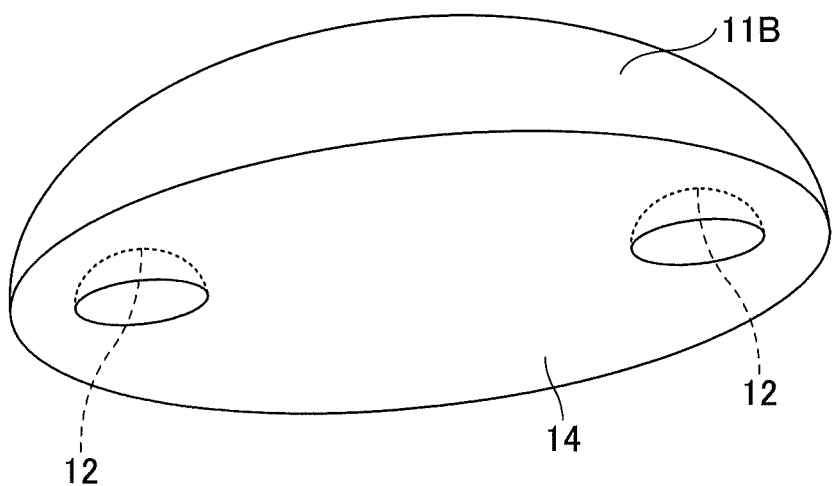
FIG. 16 is an exploded perspective view of the rain sensor of the first variation.
Figure 16:
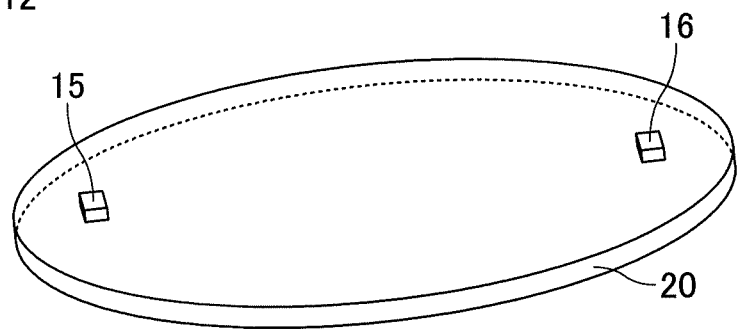
Figure 16:
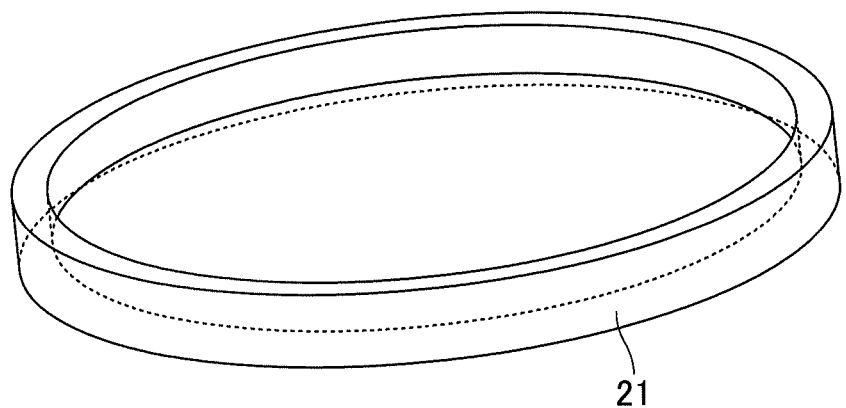

FIG. 16 is an exploded perspective view of the rain sensor 10B. The light emitting device 15 and the photo-receiving device 16 may be provided or embedded in the substrate 20. The light emitting device 15 and the photo-receiving device 16 are provided so as to be positioned inside the cavities 12 of the optical cover 11B after assembly. In the substrate 20, interconnects, via plugs, or other wirings connected to the light emitting device 15 or the photo-receiving device 16 may be formed. The rain sensor 10B may be assembled by placing the substrate 20 in the bottom cover 21 and covering the substrate 20 with the optical cover 11B.

The optical cover 11B is made of, for example, polycarbonate. In one example, the bottom face 14 has a major axis radius of 30 mm and a minor axis radius of 18.7 mm. The ellipsoidal shape of the optical cover 11B is represented by general equation (1).

$$X^2/30^2 + y^2/18.7^2 + z^2/18.7^2 = 1 \quad (1)$$

The centers of the cavities 12 may be arranged at a distance of 24 mm along the major axis from the center of the bottom face 14. The cavity 12 may have a diameter of 3 mm.

The bottom cover 21 is formed in accordance with the elliptical shape of the optical cover 11B. The substrate 20 may be processed into a shape that fits inside the bottom cover 21.

Figure 17:
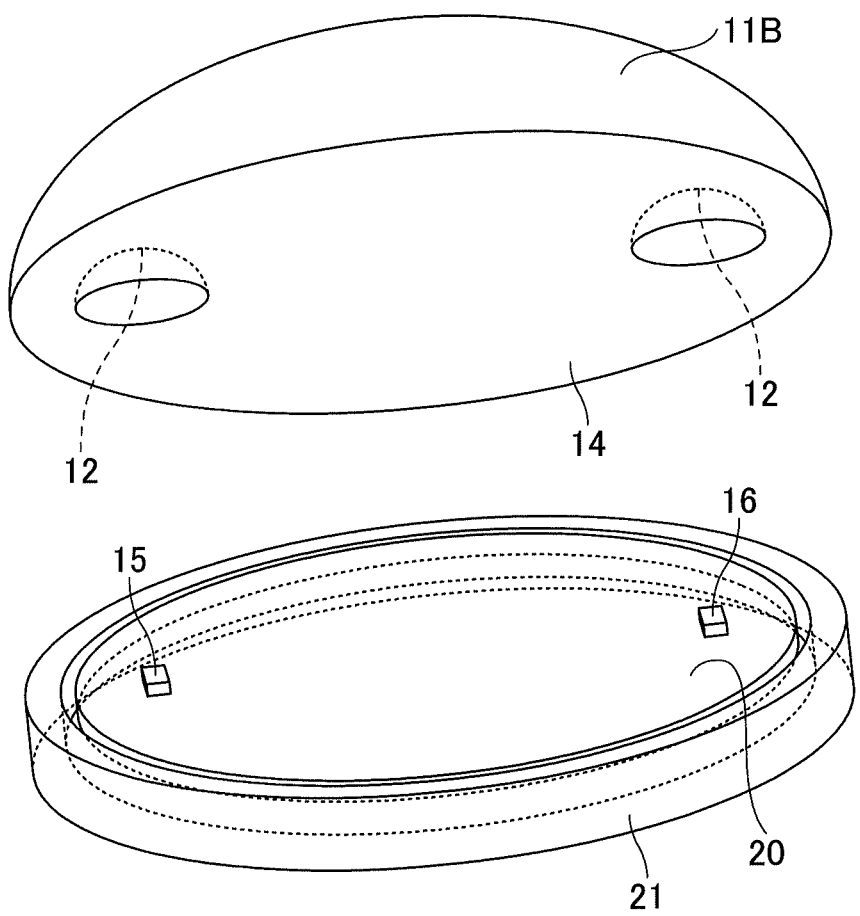
FIG. 17 illustrates a substrate accommodated in a bottom cover in the first variation.

FIG. 17 illustrates a configuration in which the substrate 20 is accommodated in the bottom cover 21. The rain sensor 10B may be designed such that the top surface of the substrate 20 and the periphery of the bottom cover 21 are aligned in the height direction when the substrate 20 is accommodated in the bottom cover 21.

Figure 18A:
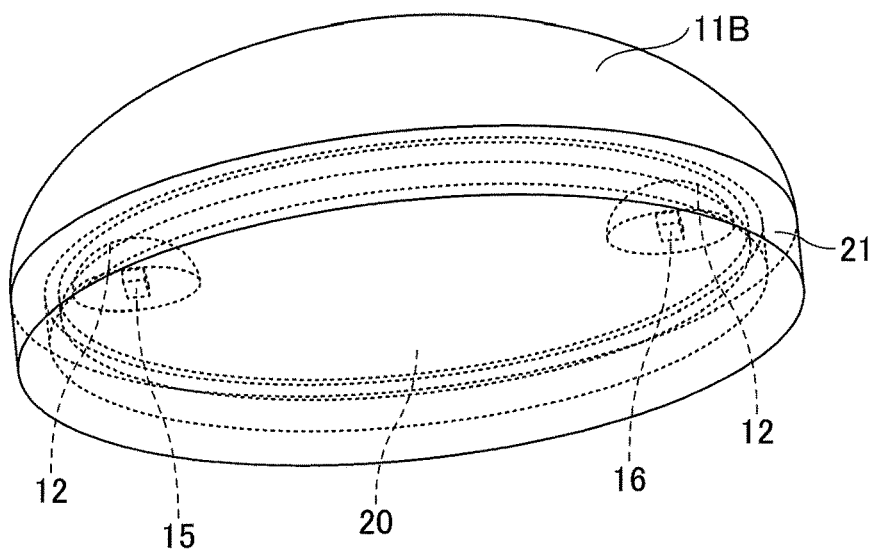
FIG. 18A is a perspective view of the assembled rain sensor of the first variation.
Figure 18B:
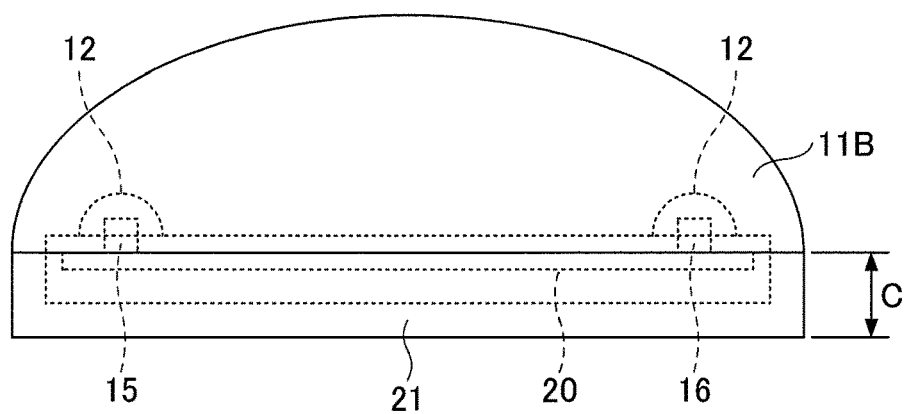
FIG. 18B is a side view of the assembled rain sensor of the first variation.

FIG. 18A and FIG. 18B illustrate in a perspective view and a side view, respectively, the assembled state of the rain sensor 10B in which the bottom cover 21 is covered with the optical cover 11B. The optical cover 11B is used as a top cover. When using the optical cover 11B with the dimensions described above, the height C of the periphery of the bottom cover 21 is, for example, 5 mm. The height of the rain sensor 10B as a whole is about 20 mm, and a simple and compact ellipsoidal rain sensor can be achieved.

When the rain sensor 10B is used, a wide area can be guaranteed as the effective detection area, except for the small parts at the opposite ends along the major axis of the optical cover 11B. Besides, since the eccentricity is selected in consideration of the influence of Fresnel reflection, deposition of raindrops or waterdrops can be detected at high sensitivity, while the sensor size is reduced.

Other Variations

Figure 19:
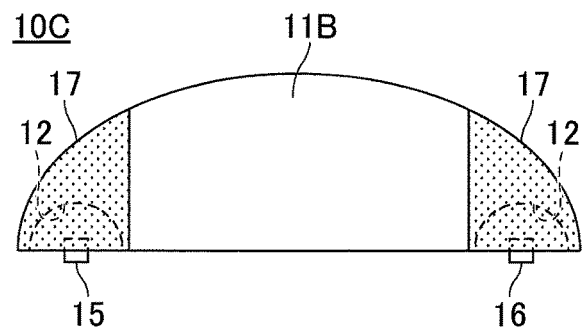
FIG. 19 is a schematic diagram of a rain sensor of the second variation.

FIG. 19 illustrates a configuration of a rain sensor 10C as the second variation. The rain sensor 10C has a coating film 17 that partially covers the surface of the optical cover 111B at an area other that the effective detection area. The coating film 17 may be a light absorbing film or a light reflecting film.

Defining the effective detection area as an area on a spheroid that satisfies the conditions for "total internal reflection at an interface with air and non-total reflection at an interface with water", it may be desirable occasionally to avoid using areas outside of the effective detection area. For example, a case where the rain sensor 10C is provided to a place where external light is likely to enter applies.

It is desirable for the rain sensor to have flat characteristics of sensitivity with less noise. By providing the coating film 17 to the areas outside of the effective detection area, near infrared rays in the sunlight can be prevented from interfering with the infrared light output from the light emitting device 15. In addition, the change in the quantity of light received by the photo-receiving device 16 is not affected, even when raindrops fall onto the coating film 17. Only raindrops falling onto the effective detection area contribute to the change in the quantity of received light. Because the dimensions of the effective detection area are known in advance, the amount of rain per unit area can be calculated accurately from the change in the quantity of received light.

Figure 20:
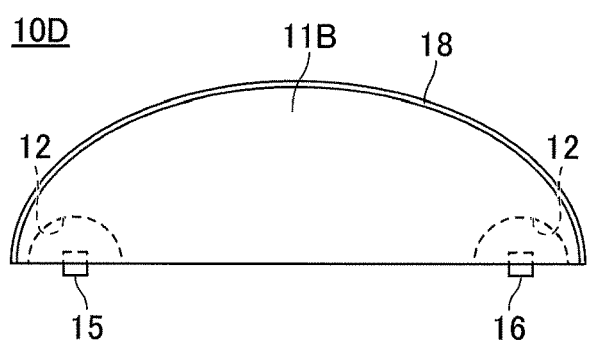
FIG. 20 is a schematic diagram of a rain sensor of the third variation.

FIG. 20 illustrates a configuration of a rain sensor 10D as the third variation. The rain sensor 10D has a water-repellent film 18 on all or a part of the surface of the effective detection area. By coating with the water-repellent film 18, raindrops that have fallen onto the effective detection area quickly flow down along the surface of the spheroid. Even when the next raindrop falls onto the same position on the optical cover 11B, it is possible to accurately detect whether or not the conditions for total internal reflection are satisfied.

The configuration of the rain sensor 10D is advantageous because the detection accuracy can be improved or recovered immediately after rain stops.

Figure 21:
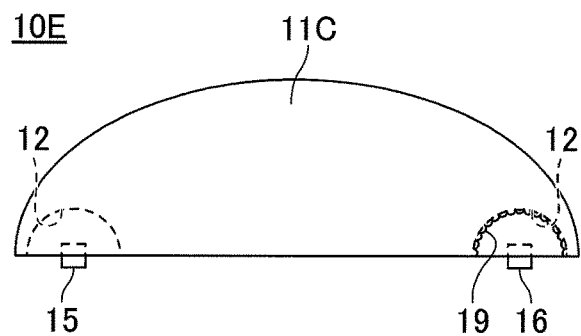
FIG. 21 is a schematic diagram of a rain sensor of the fourth variation.

FIG. 21 illustrates a configuration of a rain sensor 10E as the fourth variation. The rain sensor 10E has an optical cover 11C. The optical cover 11C has cavities 12 inside the spheroid, likewise the optical cover 11B. In the optical cover 11C, inner wall of the cavity 12 located on the photo-receiving side has a light transmitting/scattering surface 19.

When the photo-sensitive area of the photo-receiving device 16 is small, it may be difficult for the sensor to detect the light reflected from the elliptically curved surface 13, and additional processing or optical components may be required for adjustment. In the rain sensor 10E, by defining the spherical shape of the cavity 12 with the transmitting/scattering surface 19, the light collecting area for collecting light reflected from the elliptical surface can be expanded. Consequently, an extra step or configuration for guiding the light totally reflected from the curved surface 13 to the photo-receiving device 16 is unnecessary, or can be simplified.

By scattering the light reflected from the spheroid at the transmitting/scattering surface 19, the total quantity of light received at the photo-receiving device 16 may decrease. However, the target signal component is not hidden in the noise, and there is no problem as long as the change in signal due to deposition of raindrops can be detected.

Figure 22A:
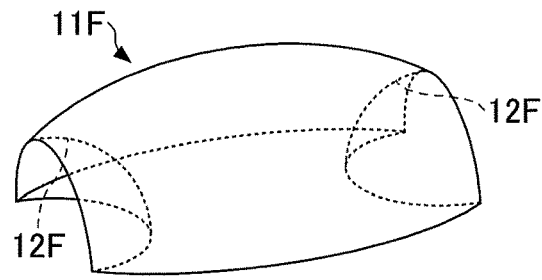
FIG. 22A is a perspective view of a variation of the optical cover used in a rain sensor.
Figure 22B:
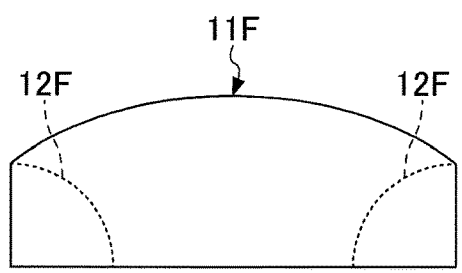
FIG. 22B is a side view of the variation of the optical cover used in the rain sensor.
Figure 22C:
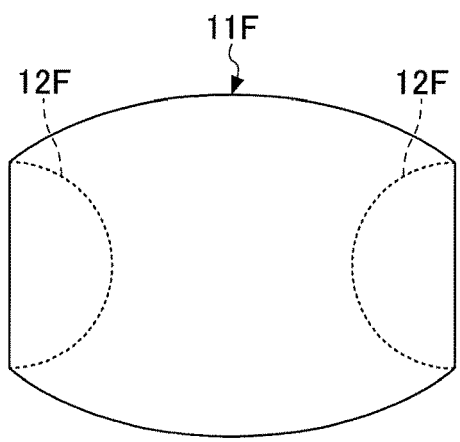
FIG. 22C is a top plan view of the variation of the optical cover used in the rain sensor.

FIG. 22A to FIG. 22C illustrate an optical cover 11F used in a rain sensor as the fifth variation. The optical cover 11F has only an elliptical surface that serves as the effective detection area, and the other parts are cut out. In the example illustrated in FIG. 22A to FIG. 22C, opposite ends along the major axis of the spheroid are cut out. The cavities 12F for housing the light emitting device 15 and the photo-receiving device 16 have a shape obtained by cutting a part of a hemisphere along a plane perpendicular to the bottom face.

By modifying the optical cover 11F to such a shape, a region that does not satisfy the conditions for "total internal reflection at an interface with a gas and non-total reflection at an interface with a liquid" may be removed in advance, and the characteristics of sensitivity are maintained satisfactory.

When the optical cover 11F illustrated in FIG. 22A to FIG. 22C is used, the bottom cover 21 has a shape corresponding to the shape of the optical cover 11F. To prevent the light emitting device 15 and the photo-receiving device 16 from being uncovered, the height of the periphery of the bottom cover 21 is adjusted so as to be aligned with the height of the cavities 12F of the optical cover 11F. The bottom part including the cavities 12F of the optical cover 11F is totally housed in the bottom cover 21.

The droplet sensors of the present invention have been described using specific examples of the embodiment and variations; however, the present invention is not limited to these examples. Although the second to the fifth variations have been described on the basis of the optical cover 11B with the cavities 12, the coating film 17 (of the second variation) and the water-repellent film 18 (of the third variation) are applicable to the optical cover 11A that does not cavities 12. The coating film 17 and the water-repellent film 18 can be used together. In addition, two or more of the embodiments and the variations may be combined appropriately.

The cavity 12 may not be necessarily provided to both of the first and the second focal points, and it may be provided to only one of the focal points. In such case, at the other focal point, the photo-receiving device or the light-emitting device may be embedded in the optical cover, or arranged such that the optical interaction plane is in contact with the bottom face of the optical cover. Either the light emitting device 15 or the photo-receiving device 16 may be embedded in the optical cover 11, and the light-emitting surface or photo-receiving surface of the other device may be brought into surface contact with the bottom face 14 of the optical cover.

The droplet sensors of the embodiments and the variations are applicable to rain sensors, dew sensors, or the like. Rain sensors may be mounted on, for example, roadside trees, streetlights and so on, to measure distribution of local rainfall, collect weather information, automatically control vehicle wipers, etc. Dew sensors may be used in office automation equipment such as copy machines or server systems. Rain sensors may be installed in environment sensors for use in combination with other sensors (such as temperature sensors, wind direction/air flow sensors, or the like).

This application is based upon and claims the benefit of the priority of earlier-filed Japanese patent application No. 2017-254956, filed Dec. 28, 2017, the entirety of which is incorporated herein.

LIST OF SYMBOLS 10 droplet sensor
10A-10E rain sensor
11A, 11B, 11C, 11F optical cover
12 cavity
13 curved surface
14 bottom face
15 light emitting device
16 photo-receiving device
17 coating film
18 water-repellent film
19 transmitting/scattering surface

What is claimed is:

1. A droplet sensor comprising:
an optical cover having a curved surface that forms a part of a spheroid;
a light source positioned at a first focal point of an ellipse, the first focal point facing the curved surface; and
a photodetector positioned at a second focal point of the ellipse,
wherein the ellipse has an eccentricity determined such that the curved surface has an effective detection area that satisfies conditions for total internal reflection at an interface with a gas and that does not satisfy the conditions for total internal reflection at an interface with a liquid, and
wherein the optical cover is a transparent solid with respect to a wavelength of the light source, the transparent solid having a first spherical space and a second spherical space at a bottom, the light source being positioned inside the first spherical space and the photodetector being positioned inside the second spherical space.

2. The droplet sensor as claimed in claim 1, wherein an area on the curved surface outside of the effective detection area is coated with a light absorbing film or a light reflecting film.

3. The droplet sensor as claimed in claim 1, wherein a part of the spheroid, outside of the effective detection area, is cut out by a plane perpendicular to the ellipse.

4. The droplet sensor as claimed in claim 1, wherein a part or all of the effective detection area is covered with a water-repellent film.

5. The droplet sensor as claimed in claim 1, wherein an incident angle of a light from the light source onto the curved surface is designed such that a reflectance at the curved surface becomes 0.5 or less when the light enters the liquid.

6. The droplet sensor as claimed in claim 5, wherein the incident angle of the light from the light source onto the curved surface is designed such that the reflectance at the curved surface becomes 0.1 or less when the light enters the liquid.

7. The droplet sensor as claimed in claim 1, wherein an index of refraction of the optical cover ranges from 1.4 to 1.8, and the eccentricity of the ellipse ranges from 0.7 to 0.85.

8. The droplet sensor as claimed in claim 1, wherein an index of refraction of the optical cover is 1.4±0.01, and the eccentricity of the ellipse is greater than 0.7.

9. The droplet sensor as claimed in claim 1, wherein an index of refraction of the optical cover is 1.6±0.01, and the eccentricity of the ellipse is greater than 0.6 and smaller than or equal to 0.9.

10. The droplet sensor as claimed in claim 1, wherein an index of refraction of the optical cover is 1.8±0.01, and the eccentricity of the ellipse is greater than 0.557 and smaller than 0.9.

11. A droplet sensor comprising:
an optical cover having a curved surface that forms a part of a spheroid;
a light source positioned at a first focal point of an ellipse, the first focal point facing the curved surface; and
a photodetector positioned at a second focal point of the ellipse,
wherein the ellipse has an eccentricity determined such that the curved surface has an effective detection area that satisfies conditions for total internal reflection at an interface with a gas and that does not satisfy the conditions for total internal reflection at an interface with a liquid,
wherein the optical cover is a transparent solid with respect to a wavelength of the light source,
wherein the transparent solid has a cavity at the second focal point of the ellipse, and
the photodetector is provided in the cavity, an interface between the cavity and the transparent solid is a transmitting and scattering surface.

12. The droplet sensor as claimed in claim 11, wherein the light source is embedded in the transparent solid at the first focal point.

13. The droplet sensor as claimed in claim 11, wherein a light emitting surface of the light source is in surface-contact with a bottom face of the optical cover at the first focal point.

14. The droplet sensor as claimed in claim 11, wherein the interface between the cavity and the transparent solid is spherical.

* * * * *